US005263596A

United States Patent [19]

Williams

[11] Patent Number: 5,263,596

[45] Date of Patent: Nov. 23, 1993

[54] MEDICATION DISPENSER STATION SUB-ASSEMBLY

[76] Inventor: David R. Williams, 11323 Capilla Rd., San Diego, Calif. 92127

[21] Appl. No.: 7,665

[22] Filed: Jan. 22, 1993

Related U.S. Application Data

[63] Continuation-in-part of Ser. No. 800,970, Dec. 2, 1991, abandoned.

[51] Int. Cl.$^5$ .............................................. B65G 59/00

[52] U.S. Cl. .................................... 221/153; 221/154; 221/186; 221/195; 221/198; 221/258; 221/227; 221/230; 221/279; 221/289

[58] Field of Search ............... 221/131, 153, 154, 186, 221/194, 195, 197, 198, 227, 230, 258, 292, 293, 279, 289

[56] References Cited

U.S. PATENT DOCUMENTS

| | | | |
|---|---|---|---|
| 3,104,781 | 9/1963 | Clift | 221/197 |
| 3,501,131 | 3/1970 | Grantham | 221/194 |
| 4,134,520 | 1/1979 | Collins et al. | 221/227 |
| 4,423,827 | 1/1984 | Guigan | 221/131 |
| 4,600,119 | 7/1986 | Olson | 221/197 |
| 4,869,395 | 9/1989 | Rubbmark | 221/131 |
| 5,014,875 | 5/1991 | McLaughlin et al. | 221/2 |
| 5,190,185 | 3/1993 | Blechl | 221/154 |

*Primary Examiner*—H. Grant Skaggs
*Attorney, Agent, or Firm*—John J. Murphey

[57] ABSTRACT

A sub-assembly for use in a medication dispenser station for controller actuated dispensing of pharmaceutical items in single quantities from locked storage and allowing rapid reloading of more items all under extreme security and heightened accountability, comprising a chassis for insertion into the cabinet for secure mounting therein, including an unlockable front reloading access door, pharmaceutical retrieval tray depending therebelow and a discharge chute opening from interior the access door down into the tray, at least one narrow stock-supporting magazine slidably mounted in the chassis extending rearward from inside the front access door for retaining a stock of pharmaceutical items in vertically oriented, front-to-rear alignment therein, an ejector interconnected the magazine for moving the forward-most pharmaceutical item in the magazine into position over the discharge chute for dispensing into the retrieval tray upon command while retaining the other items in locked storage in the magazine, a bi-sequential lock for movement through one sequence to selectively unlock the ejector from the magazine for limited inter-movement therewith to dispense a pharmaceutical item from the cabinet while maintaining all other items in locked storage, and through another sequence to release a single magazine for at least partial withdraw from the chassis for reloading and later re-insertion and, a motor driven actuator in communication with the controller for receiving data and sequence commands therefrom and cycling the bi-sequential lock through its appropriate sequence.

27 Claims, 20 Drawing Sheets

MEDICATION DISPENSER STATION SUB-ASSEMBLY

RELATION TO OTHER PATENT APPLICATIONS

This application is a continuation-in-part of my previously filed patent application Ser. No. 800,970 of same title, filed Dec. 2, 1991 and now abandoned.

BACKGROUND OF THE INVENTION

1. Field of the Invention

This invention pertains to a sub-assembly for use in medication dispenser stations for dispensing certain pharmaceutical items from locked storage in a hospital or nursing home environment. More particularly, this invention pertains to a sub-assembly that can stock a large quantity and variety of pharmaceutical items, dispense them one at a time upon receipt of certain electronic inputs, and that can be controllably opened for rapid reloading of further quantities of the stock in a strict accountability and security environment.

2. Description of the Prior Art

The time-honored practice of dispensing pharmaceutical items and other medications from a centralized hospital pharmacy and retaining them in locked and/or unlocked storage at specific nursing stations for later distribution to patients and for manually logging the administration of these medications in patient records has given way to a more positive and efficient format. In many hospitals and nursing homes, medicines are now held under locked storage in medication dispenser stations, such as the one disclosed in U.S. Pat. No. 5,014,875, where nursing personnel retrieve the medicine from locked storage for dispensing, simultaneously and automatically updating the patient's records and billing. Such a modernized dispenser system reduces handling of medications, eliminates to a large extent the courier services normally involved with carrying the medications from the pharmacy directly to the nursing station, and eliminates errors generally associated with manually logged information and data.

In many of these medication dispenser stations, the locked drawers that are unlocked in response to receipt of certain access codes and other keyboard entry data include multi-compartment carousel tray-type drawers permitting limited access to the appropriate medication while denying access to other compartments in the tray. In these situations, dispensing a single medication, such as a 5 ml. preloaded syringe of narcotic or other medicine, requires utilization of the same size compartment used for dispensing other medications of a larger size.

In practice, multiples of small medical items are deposited in one compartment and dispensed therefrom as single units or in multiple doses. Access is restricted to personnel having proper security clearances, however, once access is obtained, full accountability of individual items is somewhat compromised as the personnel may now obtain more than the authorized number of items in the compartment even though these items are separated from other items residing in locked compartments elsewhere in the station. Utilizing one whole compartment for a single item would increase security and reduce the potential for pilfering. However, it would soon exhaust the inventory of locked storage compartments, thereby requiring frequent re-stocking.

Many pharmaceutical items are small in size and singular in application and, in some cases quite expensive thus requiring greater security in storing and dispensing. For instance, syringes preloaded with narcotics and vials or ampules containing tissue plasminogen activators, and medical test kits are often used in single quantities only and controls are required to ensure fully locked storage and absolutely controlled single-unit dispensing. Further, during re-stocking with new items, security must be maintained to prevent access to other items already in storage. This is all the more difficult when it is desired to store large quantities of items numbering into the hundreds and dispense them individually upon command. There is a serious need, therefore, for a sub-assembly that may be installed in a medication dispenser station to hold a large quantity of small pharmaceutical items, in locked storage, for controlled dispensing from such storage where the total amount of the stock must be sufficient to last through the normal pharmaceutical dispensing period, where the accountability of storage and dispensing must be raised to near-perfect levels, and where restocking may be undertaken and completed in rapid order also under full security.

SUMMARY OF THE INVENTION

This invention is a sub-assembly for insertion into the cabinet of a computer controlled medical dispenser station of the type disclosed in U.S. Pat. No. 5,014,875 that reduces the shortcomings in the prior art heretofore described. It comprises a chassis for insertion into the station cabinet in place of one or more drawers in locked engagement therein and includes a normally secure front reloading access door, arranged flush with the other drawers therein, and a pharmaceutical retrieval tray depending below the door. At least one, but more preferably a plurality of narrow, upstanding magazines are positioned in side-by-side arrangement in the chassis extending from an inside discharge chute rearward for retaining therein a large stock of pharmaceutical items such as syringes, vials and ampules in vertically oriented front-to-rear alignment. In such an alignment, a substantial number of these items may be neatly and securely stocked therein under continuous security. In the preferred embodiment of this invention, 20 magazines are used, each holding up to 50 items, for a total stock of 1,000 items.

An ejector means is provided with each magazine for moving the items one-at-a-time from locked storage to the retrieval tray. A unique bi-sequential locking means is also provided for operation, upon commands generated through keyboard entry data, in one sequence to selectively unlock the ejector means of a particular magazine and cause dispensing of one specific pharmaceutical item at a time into the retrieval tray for use by medical personnel while retaining all other items in that magazine in locked storage, and in another keyboard commanded sequence, to unlock the reloading access door and individually unlock a particular magazine to permit it to be pulled partially out of or be fully removed from the cabinet through the open access door for reloading while retaining all other magazines and their stocked items in locked storage secured from access during this reloading cycle. A movable shuttle is provided with each magazine to facilitate dispensing of the items and to permit rapid reloading of the magazine to reduce down time of the station.

A control unit, including a keyboard entry means, for entry of predetermined access data such as personnel passwords and dispensing commands, and a controller responsive to this inputted data are already provided with the cabinet and used with prior art dispensers. The end result is a sub-assembly completely compatible with the medication dispensing station for efficiently retaining a large number of small pharmaceutical items in controlled storage and dispensing them under circumstances where accountability is maximized and unauthorized access is minimized. The novelty of incorporating a single bi-sequential locking means with individual actuator means for each magazine provides self-contained security for each chassis and a minimum of modification of the medication dispensing station in order to retro-fit it with this sub-assembly. The unique magazine design allows rapid refill with pharmaceutical items to minimize the down time of the station during refill. In another embodiment of this invention, means are provided to accommodate syringes, ampules and vials of different sizes, to be stored in separate magazines, for operation in the same manner as the syringe-filled magazine to be hereinafter described.

Accordingly, the main object of this invention is a sub-assembly for utilization or retrofit in medication dispenser stations that will retain a large quantity of stock of pharmaceutical items for controlled dispensing under traceability not heretofore obtainable in the prior art. Other objects of the invention include a sub-assembly having its own locking and unlocking mechanisms to operate the controlled dispensing system independent of other mechanisms generally associated with the dispensing station. Further objects include a self-contained, fully operable sub-assembly allowing rapid loading of large quantities of small pharmaceutical items in controlled alignment for safe and efficient dispensing from locked storage into an easily accessible retrieval tray.

These and other objects of the invention will become more apparent upon reading the following description of the preferred embodiment taken together with the drawings that are appended hereto. The scope of protection sought by the inventor may be gleaned from a close reading of the claims that conclude this specification.

DESCRIPTION OF THE DRAWINGS

FIG. 3 shows the door to be open and one of the magazines to be partially withdrawn therefrom;

FIG. 21 shows another embodiment of the invention in partial cross-section wherein the magazine may be partially withdrawn and pivoted downward to facilitate reloading and FIG. 5*b* is a front view of the same embodiment with the front door removed showing the full complement of 20 magazines carried on the chassis;

DESCRIPTION OF THE PREFERRED EMBODIMENT

Figure 1:
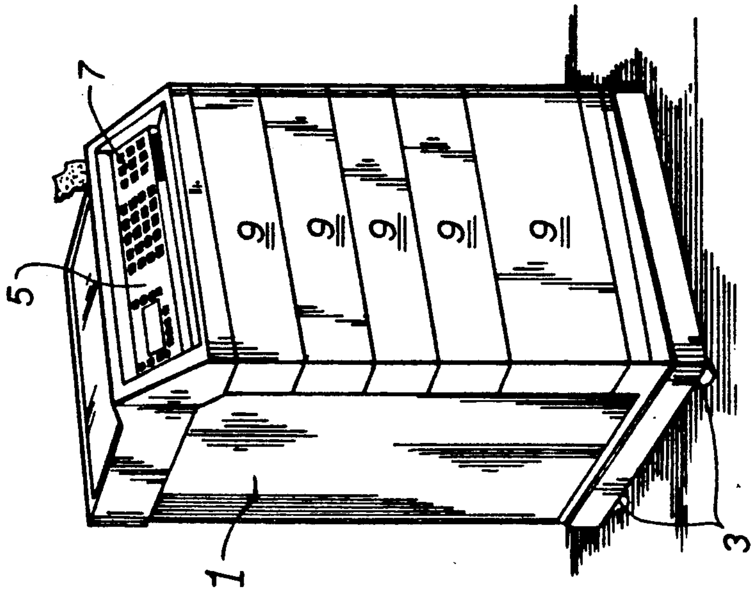
FIG. 1 is an illustrative view of a typical prior art medication dispenser station in which the present invention is useable as a sub-assembly.

Turning now to the drawings wherein like elements are identified with like numerals throughout the 29 figures, a typical medicine dispensing station is shown in FIG. 1 and is of the type disclosed in our previous U.S. Pat. No. 5,014,875 and generally shows a compact cabinet 1 which may be supported on wheels 3, a control unit 5, generally mounted within the upper extent of cabinet 1 and including appropriate computerized memory components of a type generally well-known to those skilled in the art, in association with a compact keyboard 7 in a position exposed for easy access for inputting information such as user password or medical personnel identification code and medication dispensing data. A plurality of drawers 9 are mounted for partial withdrawal upon entry of the appropriate data.

Figure 3:
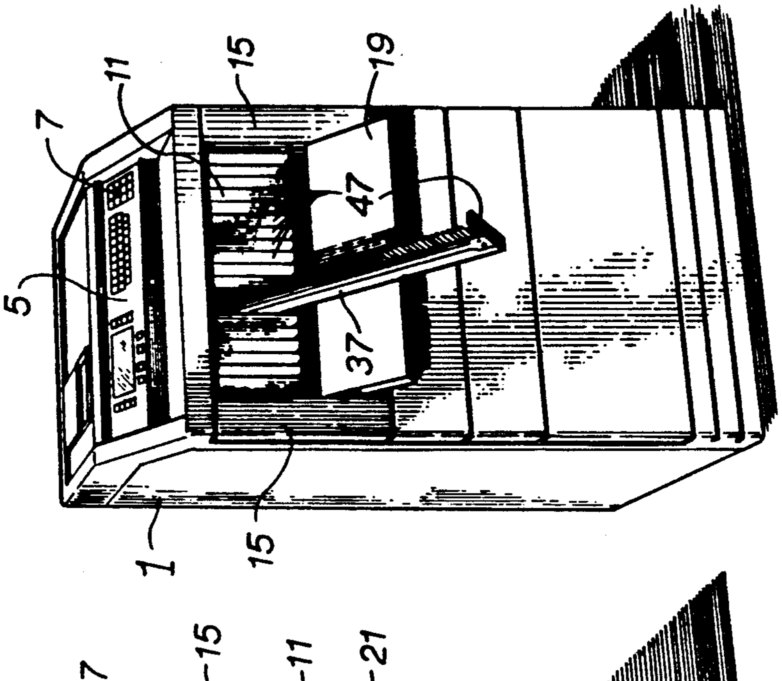
FIGS. 2 and 3 are illustrative views of the preferred embodiment of the sub-assembly of this invention shown positioned in the medication dispenser station shown in FIG. 1 where
Figure 2:
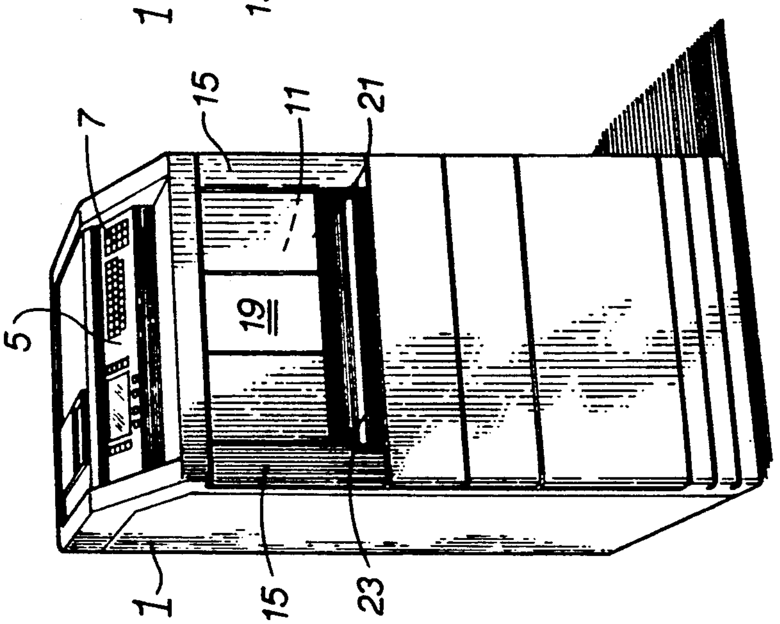
Figure 4:
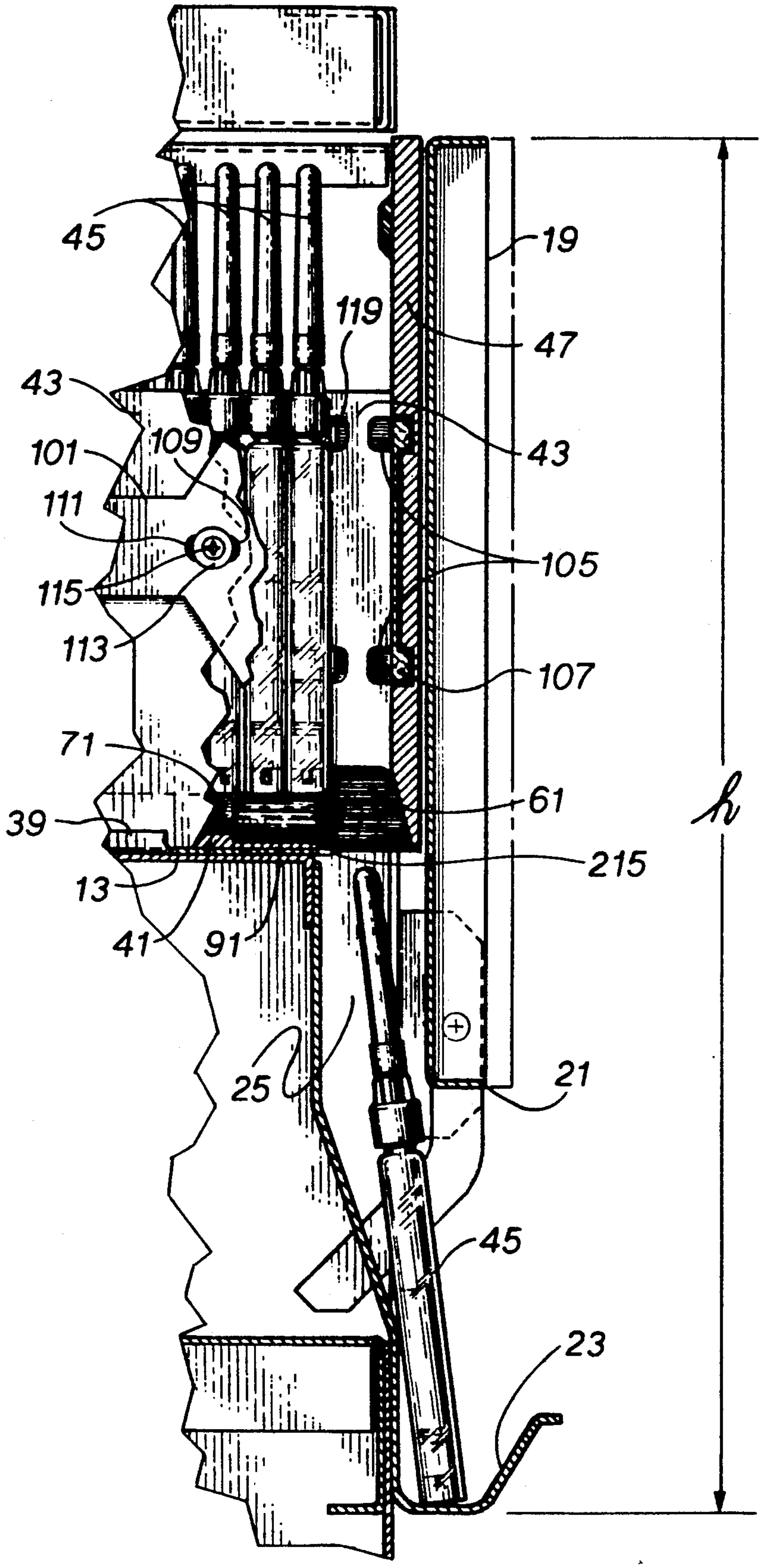
FIG. 4 is a fragmentary side view, partially in section, of the front of the sub-assembly chassis showing the unlockable front reloading access door, the pharmaceutical retrieval tray depending therebelow and the discharge chute opening from interior the front of the chassis downward into the tray.
Figure 21:
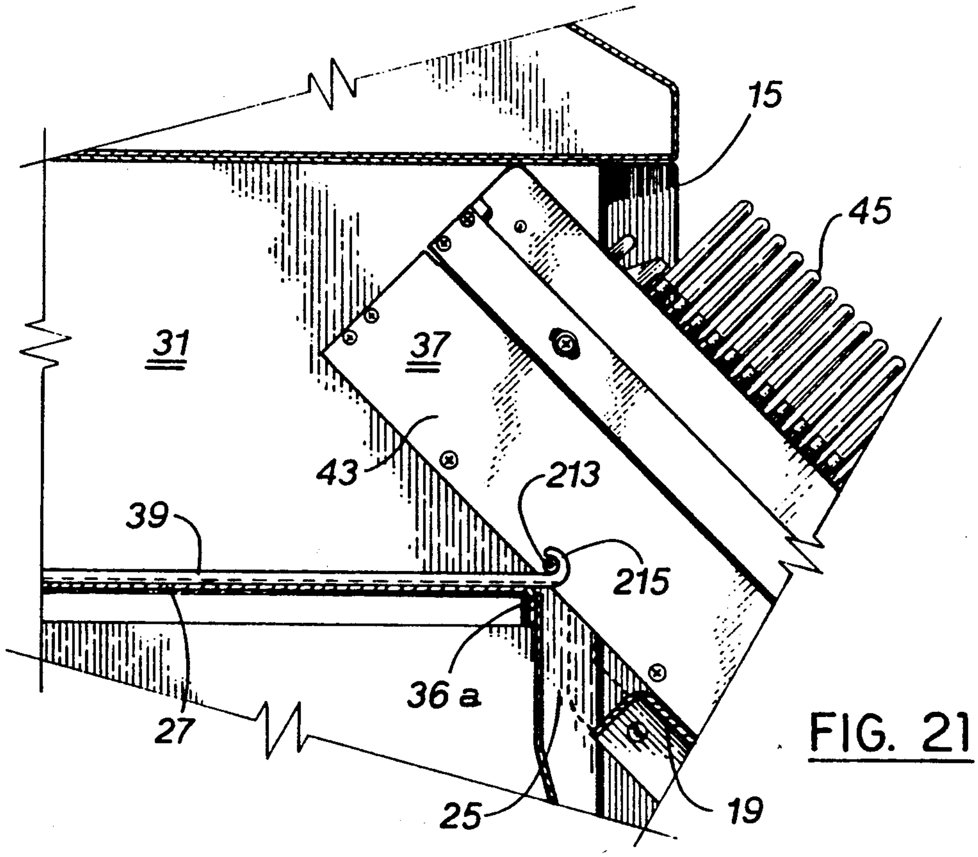

The invention herein concerns a sub-assembly generally indicated at 11 retro-fittable into the space occupied by one or two drawers as shown in FIG. 2. As shown in FIGS. 2–4, the sub-assembly of this invention comprises a chassis 13 for insertion into cabinet 1 for secure mounting therein by a pair of spaced-apart front border plates 15 with security fasteners as are already known in the art. A front reloading access door 19 is located along the upper central front of chassis 13 and pivotally mounted along its lower edge 21 for pivotal movement between a locked, closed configuration as shown in FIG. 2 to an unlocked downwardly directed position as shown in FIGS. 3 and 21. A pharmaceutical retrieval tray 23 depends below access door 19 and extends substantially the entire width of said door. A discharge chute 25 (see FIG. 4) opens from interior front access door 19 down into tray 23 for passage of pharmaceutical items upon being dispensed as hereinafter more fully described.

Figure 5A:
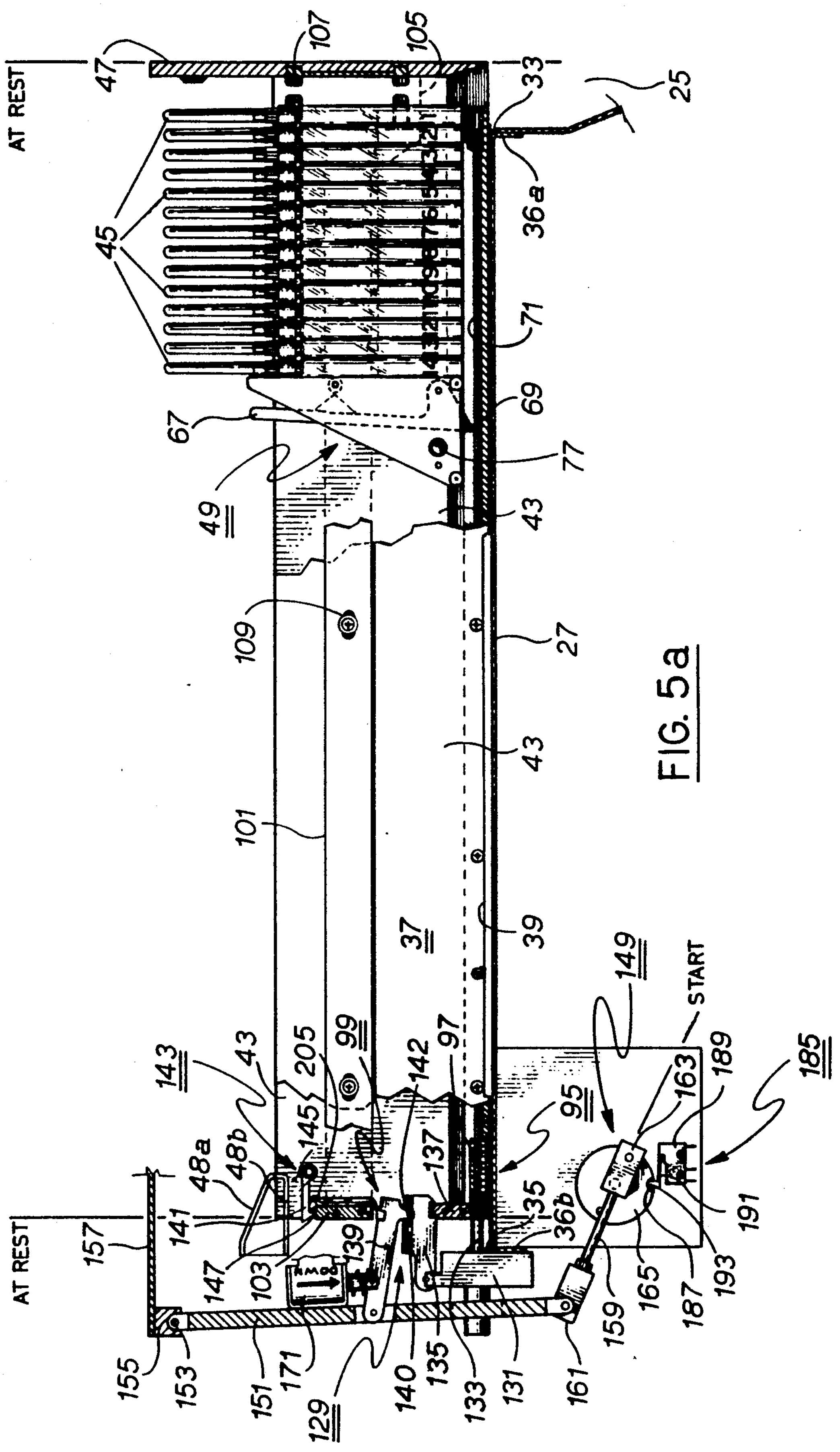
FIG. 5*a* is a side elevational view, partly in section, of the preferred embodiment of this invention.
Figure 5B:
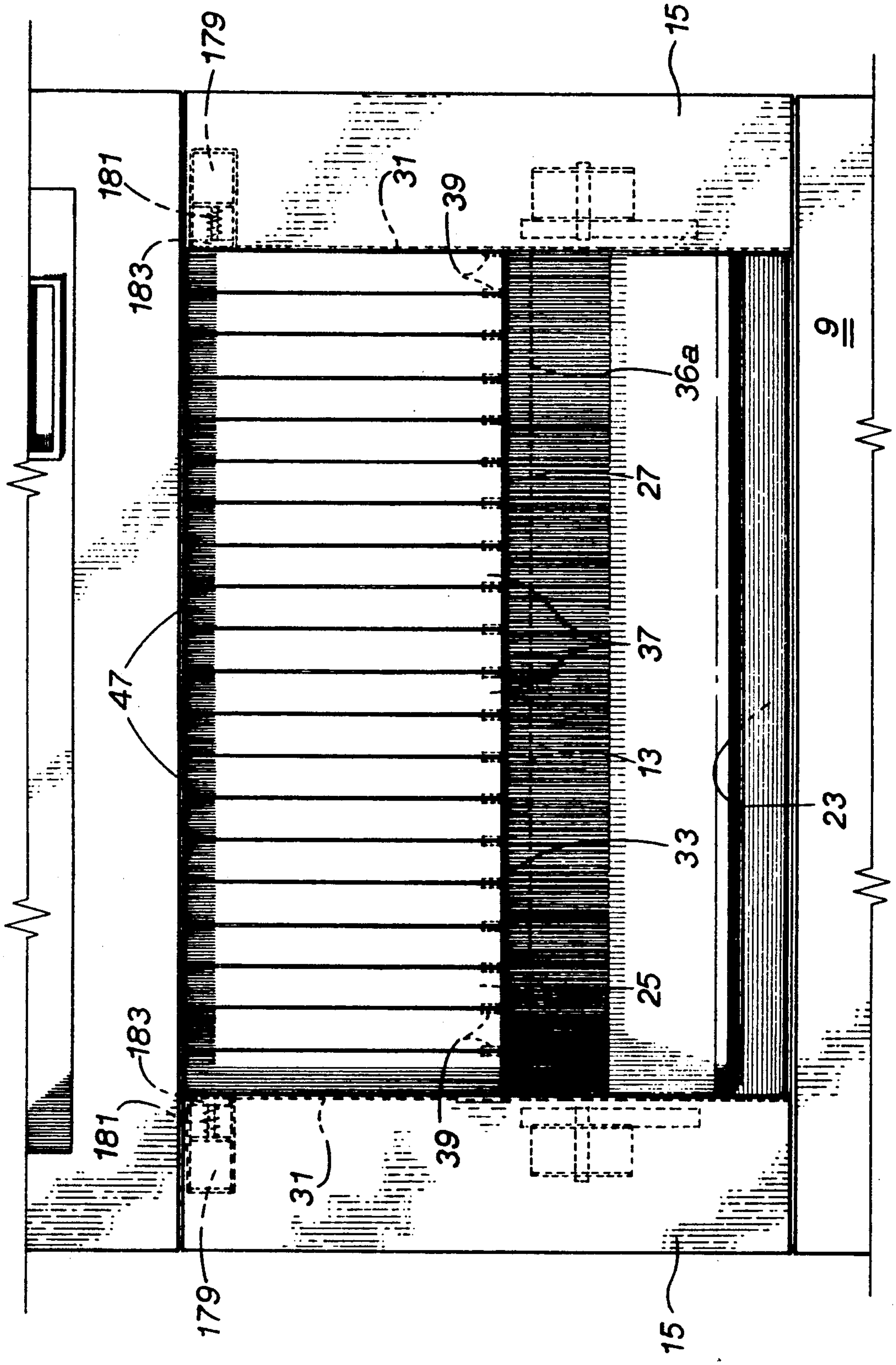
FIG. 5*b* is a front view of the same embodiment as shown in FIG. 3 with the front door removed showing the full complement of 20 magazines carried on the chassis.

As shown in FIGS. 5a and 5b, chassis 13 includes a base plate 27 that defines a square or rectangular periphery bounded by a pair of spaced-apart upwardly extending side walls 31, a front marginal edge 33 forming the rear edge of discharge chute 25, and a rear marginal edge 35. Once chassis 13 is retro-fitted into cabinet 1, it remains securely mounted therein. The overall height "h" of chassis 13, as shown in FIG. 4, including access door 19 and discharge chute 25, may vary depending upon the overall height of the pharmaceutical items stored therein. The drawings show the storing and dispensing of syringes generally of the type preloaded with various medications such as 2 ml. of Demerol TM or other such controlled or Class 2 substances. For shorter pharmaceutical items, height "h" may equal the height of a typical drawer removed from cabinet 1. Where syringes, as shown, or other elongated pharmaceutical items are contemplated, the overall height "h" may be as great as the height of two ordinary drawers thereby making chassis 13 a sub-assembly in lieu of two normal size drawers.

While in the prior art cabinet shown in FIG. 1, dispensing of the pharmaceutical items involves opening a specific drawer and reaching into and opening a restricted access to lift out the single pharmaceutical item or one of a group of pharmaceutical items stored therein, in this invention, access door 19 and discharge chute 25 remain in a constant locked condition during dispensing, flush against the front surface of cabinet 1 thereby denying access to the interior thereof and limiting dispensing of the pharmaceutical items stored therein to one at a time through discharge chute 25 into retrieval tray 23. Accordingly, by this means, there is no requirement to open a drawer because dispensing of the pharmaceutical items therefrom is only through their being dropped down into retrieval tray 23.

Figure 10:
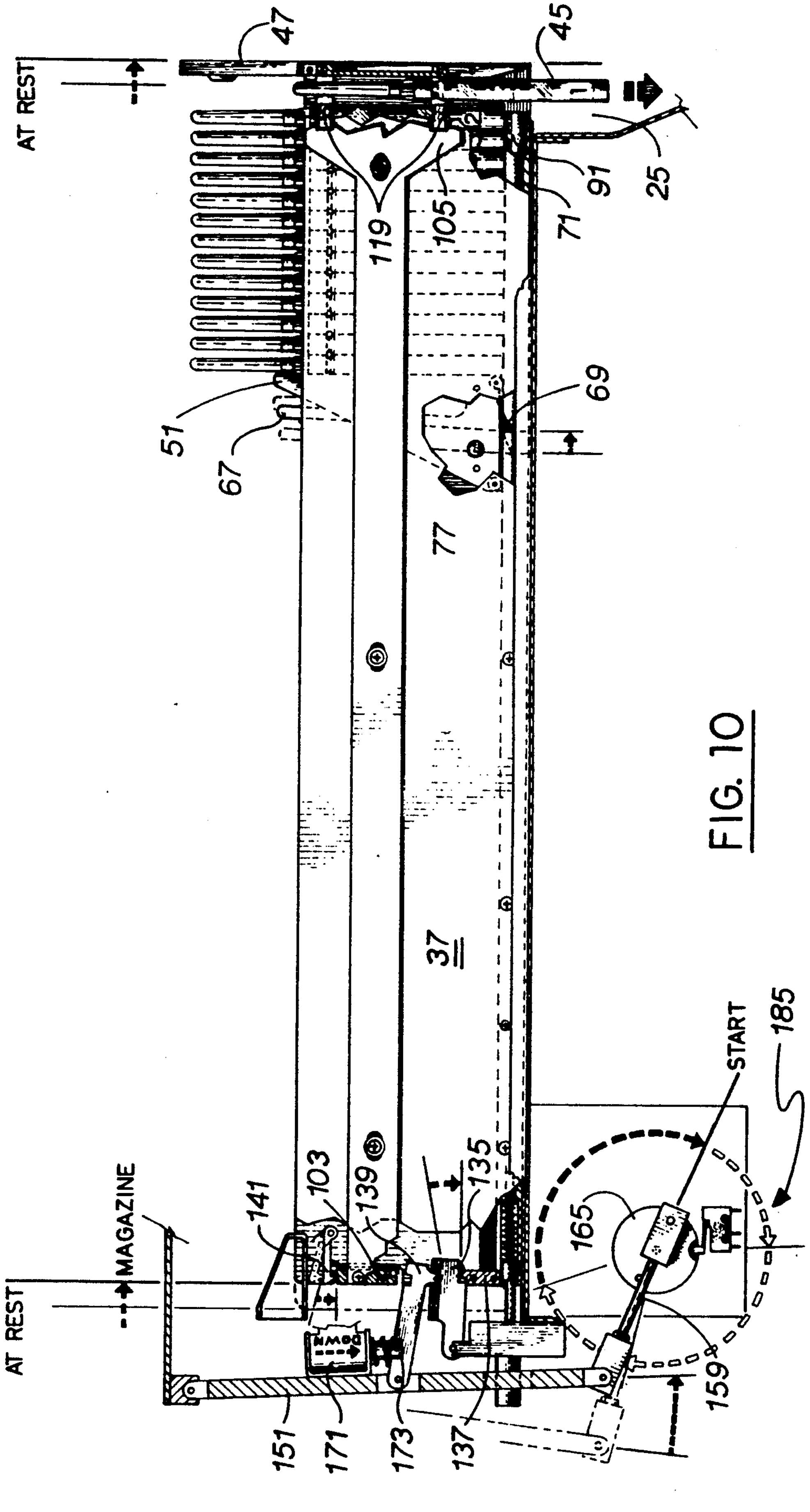
Figure 11:
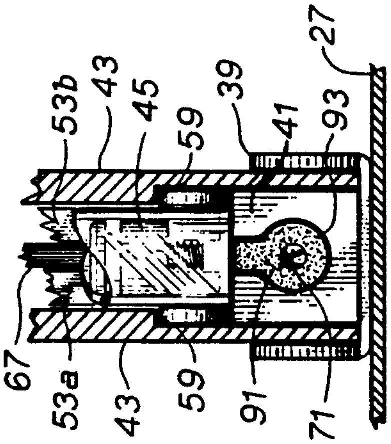
FIG. 11 is a sectional view of the magazine showing the position of a typical syringe stored therein taken along lines 11—11 in FIG. 13.
Figure 18:
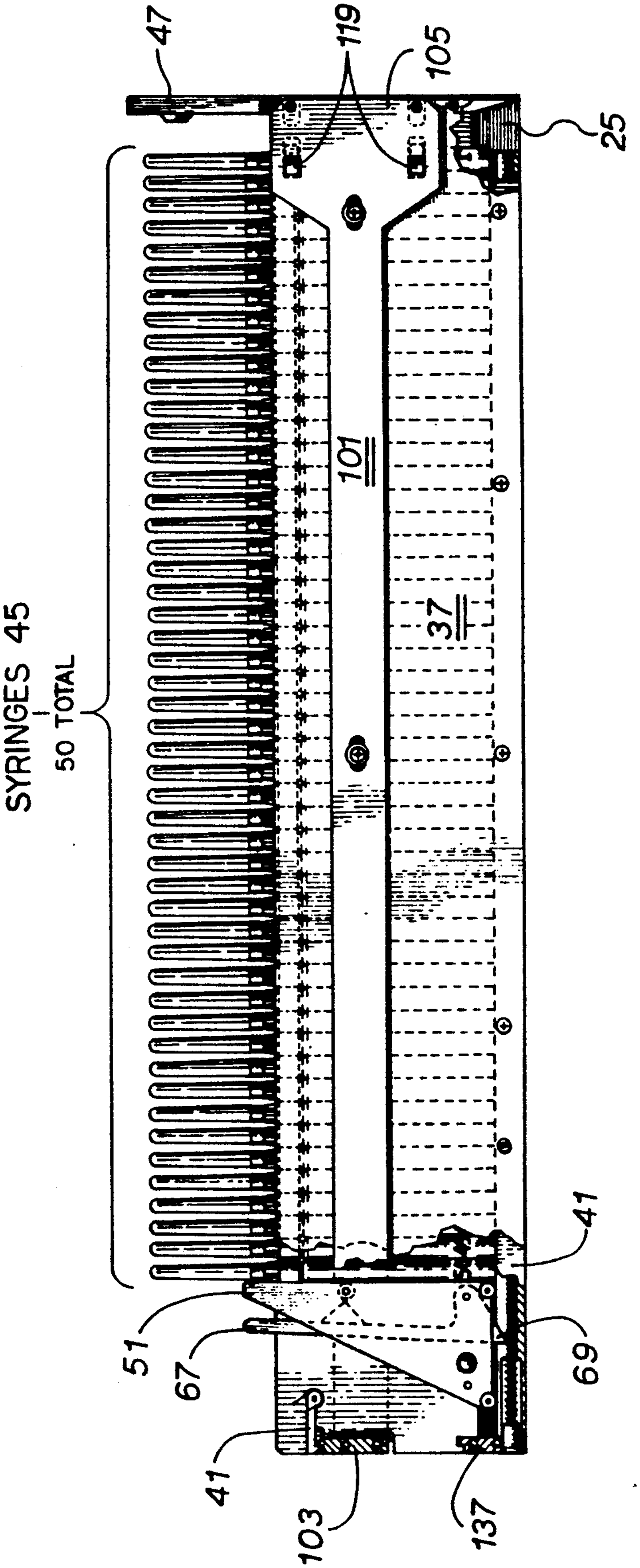

As shown in FIGS. 4, 5a, 5b, 11 and 13, a narrow stock-supporting magazine 37 is mounted on chassis base plate 27 interior of access door 19 and extends rearward from discharge chute 25 toward chassis base plate rear marginal edge 35. Magazine 37 is defined by a U-shaped base 41 (see FIGS. 5b, 11 and 13) and a pair of spaced-apart stock supporting side panels 43 extending upward therefrom one said panel fastened to each of the upwardly directed legs of base 41. An upwardly opening U-shaped magazine guide 39 extends along chassis base plate 27 for receipt therein of U-shaped base 41 and side panels 43 as shown in FIG. 11. As shown in FIGS. 5a through 10 and elsewhere, a plurality of pharmaceutical items, in this case elongated syringes 45 containing a preloaded dose of medicine, are held between magazine side panels 43 in vertically-oriented, front-to-rear alignment and, when magazine 37 is fully loaded, as shown in FIG. 18, syringes 45 extend from chassis front marginal edge 33 (which forms the rear edge of discharge chute 25), toward the rear of chassis 13.

A front block 47 comprising a strip of metal or other hard material is vertically arranged at the front of spaced-apart magazine side panels 43 as shown in FIGS. 14a, 14b, 5a and 5b and fastened to said side panels with screws or other like fasteners. Front block 47 acts to maintain the proper spacing of magazine side panels 43 and further provides a restriction against access to the interior thereof from the front of the magazine. At the rear of chassis 13 is a cross-arm 17 extending between chassis side walls 31 and formed thereon is a plurality of spacer fingers 48a–48b arranged to pass between the upper portion of the panels of each magazine to further support said magazines and hold them in vertical alignment. As shown in FIG. 3, where a plurality of magazines 37 are arranged in close fitting side-by-side arrangement across chassis-base plate 27, access to the pharmaceutical items stocked in any particular magazine is prevented by front blocks 47. As will be later explained, upon release and pivoting out of access door 19, the invention herein provides for release of one magazine 37 for withdrawal from chassis 13 while front blocks 47 connected to each of the other magazines remains in position in chassis 13 to aid in preventing access to these other magazines during this reloading cycle.

While there is no requirement for magazine side panels 43 to extend to the top of the stocked pharmaceutical items, it is obviously necessary that they extend upwardly sufficient so as to retain the pharmaceutical items held therein and in the case syringes 45 in a vertically oriented position without allowing them to fall to the side and interfere with other pharmaceutical items stocked in other magazines. In particular, it is preferred that a series of magazines 37 are placed in side-by-side parallel arrangement, each within a respective magazine guide 39, across most of the width of chassis 13. Each separate magazine may retain stock of different pharmaceutical items therein, such as syringes, vials, ampules and medical test kits, all in vertically oriented, front-to-rear alignment. In the case of syringes 45, 20 magazines each holding 50 of them would stock 1,000 syringes when full. As will be more fully explained later, input commands to control unit 5 will direct the dispensing of a particular pharmaceutical item from a particular magazine on a one-at-a-time basis into pharmaceutical retrieval tray 23.

Figure 13:
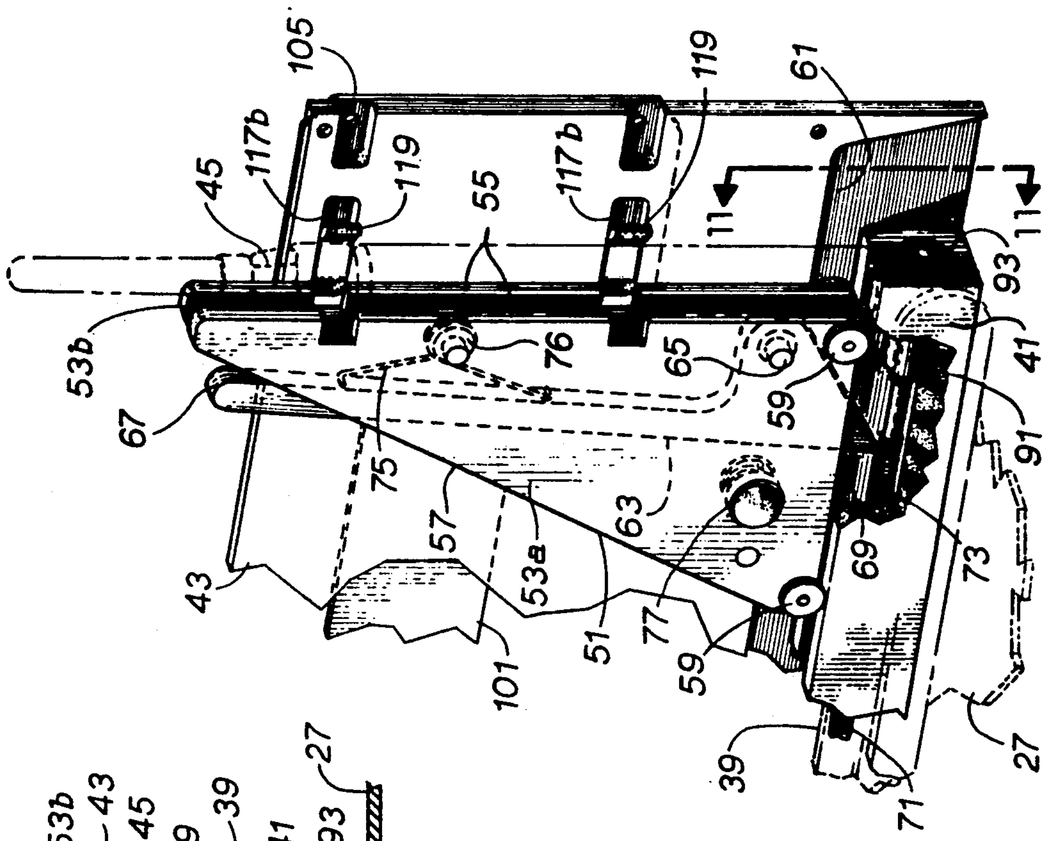
FIG. 13 is a closeup trimetric view of the shuttle of this invention showing its interaction with the rachet rod housed in the magazine.

Shuttle means 49 is shown in FIGS. 5a through 10 and 13 to be placed in communication with magazine 37 for maintaining positive pressure against the line of pharmaceutical items held in stock between magazine side panels 43 and to urge them forward in the magazine toward discharge chute 25. In the preferred embodiment of shuttle means 49, a shuttle 51 is shown slidably received between magazine side panels 43 and is defined by a pair of spaced-apart shuttle plates 53a and 53b (see FIG. 13) having common vertical front edges 55, common angled rear edges 57 and common bases including spaced-apart front and rear pairs of guide rollers 59 received in complementary guide grooves 61 formed in the lower portion of magazine side panels 43. A shuttle rachet 63 is pivotally mounted between plates 53*a* and 53*b* at 65 and is defined by an upwardly extending moveable rachet handle 67 and a lower extending pawl 69 as shown in FIG. 13. A rachet rod 71 is carried or nested in the lower portion of U-shaped magazine base 41 and has a series of threads 73 formed along the exterior surface thereof. A spring 75 mounted on shuttle plate spacer 76 biases pawl 69 into contact with threads 73. By arranging pivotal mounting 65 of moveable handle 67 ahead of pawl 69, shuttle 51 is able to be moved forward toward the front of chassis 13 by pawl 69 advancing over threads 73, however, rearward movement of shuttle 51 is prevented by pawl 69 catching or jamming on threads 73. A shuttle friction device 77 is mounted in moveable shuttle plates 53*a* and 53*b* and extends into frictional contact with the inside surface of magazine side panels 43 to ensure forward movement of shuttle 51 commensurate with forward movement of magazine side panels 43, as hereinafter described, while the interaction of pawl 69 and threads 73 on rachet rod 71 ensure that shuttle 51 does not move rearward during rearward movement of magazine side panels 43.

Figure 23:
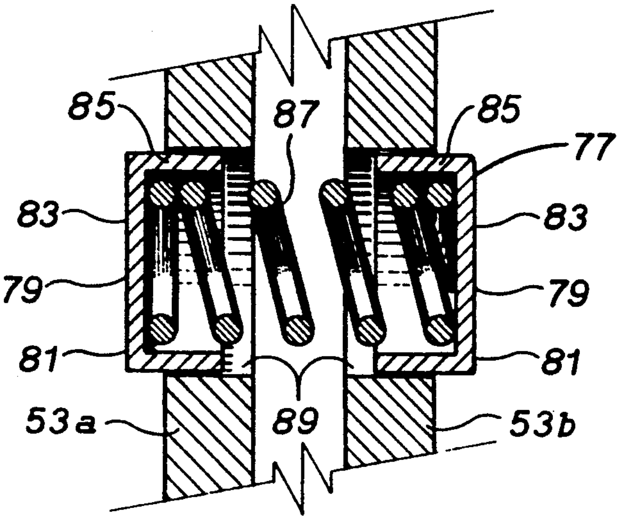
FIG. 23 is a fragmentary front view, in section, of the friction device located in the shuttle.

As shown in FIG. 23, shuttle friction device 77 comprises a pair of concave cups 79, each having a base 81 over which an outer friction surface 83 is formed, for direct contact with the inside walls of magazine panels 43, each cup surrounded by an upstanding circumferential side wall 85, held in spaced-apart and faced-apart relationship by a spring 87 in a pair of mutually aligned apertures 89 formed in shuttle side walls 53*a* and 53*b*. As magazine panels 41 move forward as hereinafter more fully explained, the friction generated between surfaces 83 and the interior surface of magazine side panels 43 overcome the pressure of bias spring 75 against pawl 69 to cause pawl 69 to ride up over threads 73. Upon rearward movement of magazine side panels 43, the interference or jamming of pawl 69 against threads 73 overcomes the friction between shuttle friction device 77 and the inside surfaces of magazine side panels 43 and allows side panels 43 to move rearward relative to shuttle 51.

Figure 12:
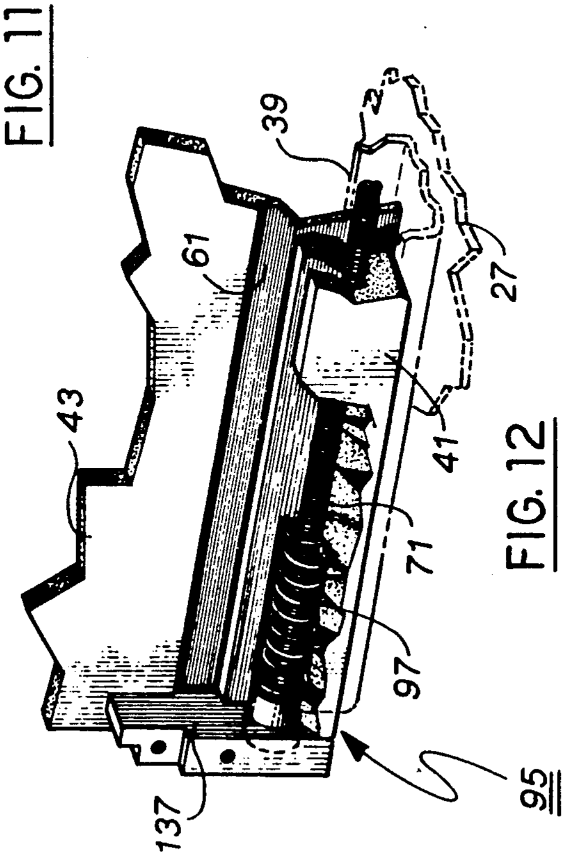
FIG. 12 is a fragmentary trimetric view of the rachet rod and associated hardware located in the base of the typical magazine.

A key-shaped guide block 91 is mounted to the front terminal end of rachet rod 71 as shown in FIGS. 4, 11 and 13 and slidably received in a bore 93 formed in the front end of magazine U-shaped base 41 adjacent the rear edge of discharge chute 25. As shown in FIG. 12, spring means 95, preferably in the form of a coiled spring 97, is positioned about the rear terminal end of rachet rod 71 near the rear of chassis 13 to provide rachet rod 71 with the capability of limited forward and rearward movement under biased pressure.

Ejector means 99 is provided in chassis 13 inter-connected with magazine 37 for moving the forward-most syringe 45 forward in the magazine into position over discharge chute 25 and releasing it to drop into retrieval tray 23 upon command from control unit 5 while retaining the other syringes in locked storage therein. Ejector means 99 is shown in FIG. 5*a* to include a pair of narrow members 101 extending forward from a common lock bracket 103 (see FIG. 6*a*) in spaced-apart relationship along the outside of magazine panels 43, expanding to form a pair of spaced-apart retainer support plates 105 and then terminate at a narrow, upstanding reference bar 107 attached therebetween (see FIG. 14*a*) by a plurality of fasteners and located on the interior surface of front block 47. Narrow members 101 are retained against the exterior surfaces of magazine side panels 43 for sliding relationship therebetween by a plurality of guide stops 109 that are received in elongated apertures 111 shown in FIG. 4. Guide stops 109 comprise a washer 113 that overlaps elongated aperture 111 and held thereover by a screw 115 threadably received in magazine side panel 43.

Figure 14A:
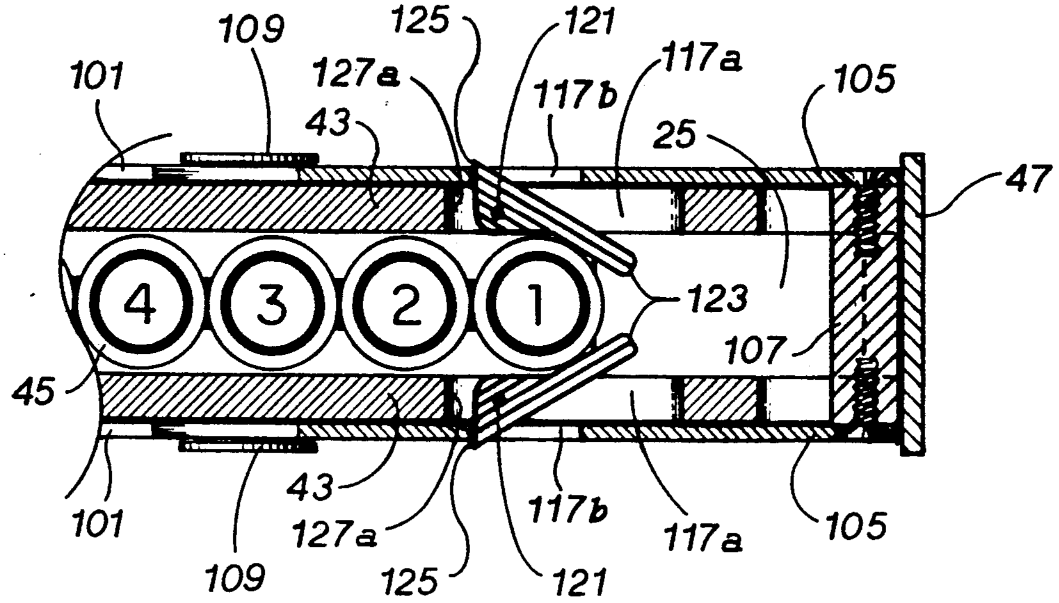
FIGS. 14*a* and 14*b* are sectional views taken along lines 14—14 in FIG. 6 of the retainers positioned in the magazine showing respectively their locked and unlocked configurations that occur during the dispensing cycle.
Figure 14B:
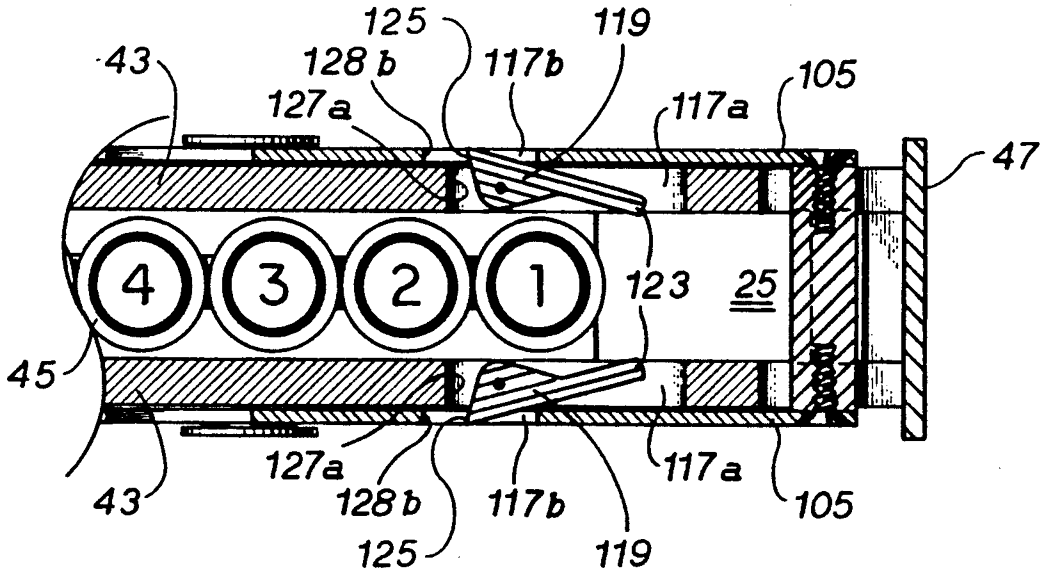

As shown in FIGS. 13, 14*a* and 14*b*, a pair of apertures 117*a* and 117*b* are formed respectively in magazine side panel 43 and retainer support plates 105. At least two, and preferably four, stock retainers 119 are pivotally mounted by pins 121 in aperture 117*a* formed in magazine side panel 43. Retainers 119 include an extended tooth 123 and a movement control edge 125 spaced-apart therefrom. When the rear edges 128*b* and 127*b* of apertures 117*b*, move forward of rear edges of 127*a* of apertures 117*a*, as shown in FIG. 14*a*, movement control edge 125 moves tooth 123 interior of the plane of magazine side panel 43 to contact syringe 45. With the retainers 119 mounted in each of side panels 43 and aligned therebetween, teeth 123 operate to prevent forward movement of syringes 45 between side panels 43 toward discharge chute 25. When, as will be more fully explained later, members 101 move rearward with respect to magazine side panels 43, aperture rear edges 128*b* move rearward relative to rear edges 127*a*, teeth 123 may be pivoted outward by the forward motion of a syringe, as shown in FIG. 14*b*, to free syringes 45 for forward movement between magazine side panels 43.

Bi-sequential locking means 129 is provided for interlocking magazine 37, shuttle means 49 and ejector means 99 to prevent unwanted intrusion into chassis 13 until acceptable data commands have been inputted to control unit 5.

Bi-sequential locking means 129 is shown in FIG. 5*a* to comprise a reference block 131 rigidly mounted to chassis base plate 27 that includes an element 133 extending therefrom into axial contact with the rear terminal end of rachet rod 71; a magazine locking arm 135 pivotally attached to reference block 131 and adapted to swing into locking relationship with a magazine lock bracket 137 that is rigidly mounted between magazine side panels 43 at the rear of magazine 37; a magazine ejector lock arm 139 slidingly carried in a groove 140 formed in magazine locking arm 17. 135 and retained therein by a pin 142 for interlocking with common lock bracket 103; and, a keeper arm 141 for interlocking magazine panels 43 with common lock bracket 103. A spring means 143 in the form of a coiled spring 145 urges keeper arm 141 down onto a notch 147 formed in lock bracket 103.

Actuator means 149 is provided as shown in FIGS. 5*a* through 10 and FIGS. 15 through 17 and 19 for receiving appropriate electric power in conformance with data and sequence commands received from controller 5 to cycle bi-sequential locking means 129 through either a sequence resulting in the dispensing of a pharmaceutical item into retrieval tray 23 or another sequence resulting in the unlocking of reloading access door 19 and partial exposure of a magazine 37 for withdrawal to be reloaded with a fresh stock of pharmaceutical items.

Actuator means 149 comprises an actuator plate 151 that spans substantially the total width of chassis 13 and is pivotally mounted at the top by a shaft 153 that is mounted in support blocks 155 that are attached to chassis 13 through a support panel 157. A single actuator plate 151 will provide the services to all of the magazines that are slidably mounted in chassis 13. Actuator plate 151 is caused to pivot about shaft 153 and moves forward and aft as shown in dotted outline in FIGS. 6 through 10 and 15 through 17 and 19 by virtue of an eccentric arm 159 pivotally attached at one end 161 to the bottom of actuator plate 151 and attached at its other end 163 attached to a drive wheel 165 at a position spaced apart from the center thereof. Drive wheel 165 is concentrically mounted on the drive shaft 167 (see FIG. 6) of a motor 169 that is in communication (not shown) with control unit 5 on the medical dispenser station. A separate solenoid 171, including a solenoid shaft 173, is mounted on actuator plate 151 for each magazine. Solenoid shaft 173 extends down into pivotal contact with magazine ejector lock arm 139. The common or default position of all parts is shown in FIG. 5a. FIGS. 5a through 10 show the dispensing sequence while FIGS. 15 through 19 show the loading sequence. In the dispensing cycle, the operations that take place are as follows:

In FIG. 5a and at rest, solenoid 171 is de-energized and solenoid shaft 173 is extended downward therefrom. The combined weight of solenoid shaft 173, magazine locking arm 135 and magazine ejector lock arm 139, supplemented by the bias pressure from solenoid shaft spring 175, causes magazine locking arm 135 to be biased downward so that a notch 177 formed therein fits down over the upper edge of magazine lock bracket 137 to aid in holding magazine 37 in locked security on chassis 13 in cabinet 1. In addition, keeper arm 141, under bias pressure from spring means 143, locks over the top of lock bracket 103 to interlock ejector means 99 with magazine 37.

As shown in FIG. 5b, at least one but more preferably a pair of solenoids 179 located along the sides of chassis 13 behind border plates 15 are de-energized allowing their keeper arms 181 to fit over door latches 183 to maintain access door 19 in a fully locked and secured position flushed with the front of cabinet 1.

Actuator plate 151 is held by eccentric arm 159 in its forward most position as shown in FIG. 5a by cycle tracking and control means 185. In one embodiment, cycle tracking and control means 185 is shown in FIG. 5a to comprise a detent 187 formed in the periphery of drive wheel 165 and a detent switch 189 mounted in close proximity therewith to be actuated when switch arm 191 is moved outward upon coincidence of detente 187 with a switch arm actuator 193.

Figure 22A:
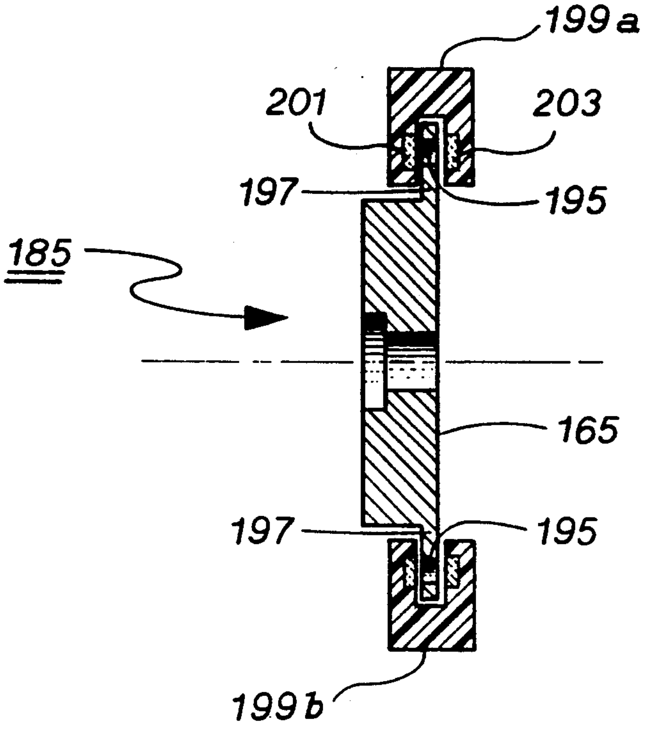
FIGS. 22*a* and 22*b* are cross-section and close-up views respectively of another embodiment of the cycle tracking and control means of this invention.
Figure 22B:
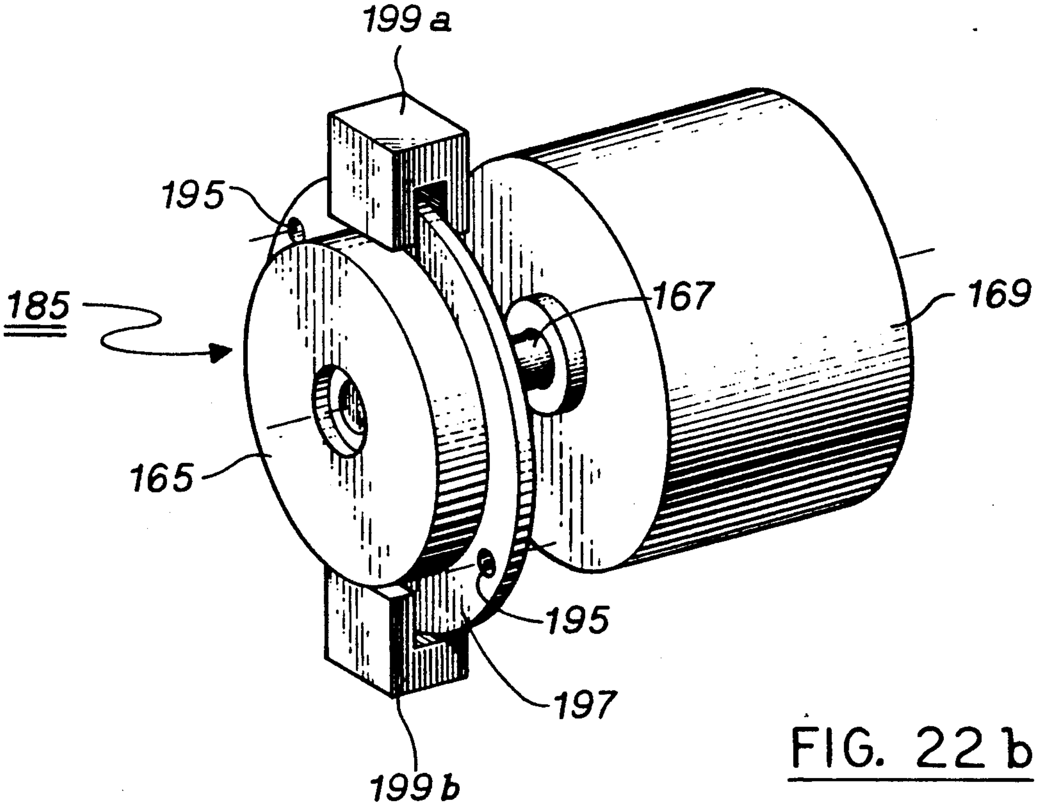

In another embodiment shown in FIGS. 22a and 22b, cycle tracking and control means 185 comprises an aperture 195 formed through a thin outer collar 197 peripherally and concentrically attached to drive wheel 165 over which a pair of optical sensors 199a and 199b are mounted each having an infrared source 201 directed through said aperture from one side of collar 197 to be received by a receptor 203, such as a photoelectric cell, mounted on the other side of collar 197. Aperture 195 allows light to pass therethrough so that optical sensor 199a can monitor the angular displacement of said drive wheel 165 and count each 180° of rotation thereof through the dispensing cycle and sensors 199a and 199b can monitor the displacement through the reloading cycle.

Figures 6, 6A:
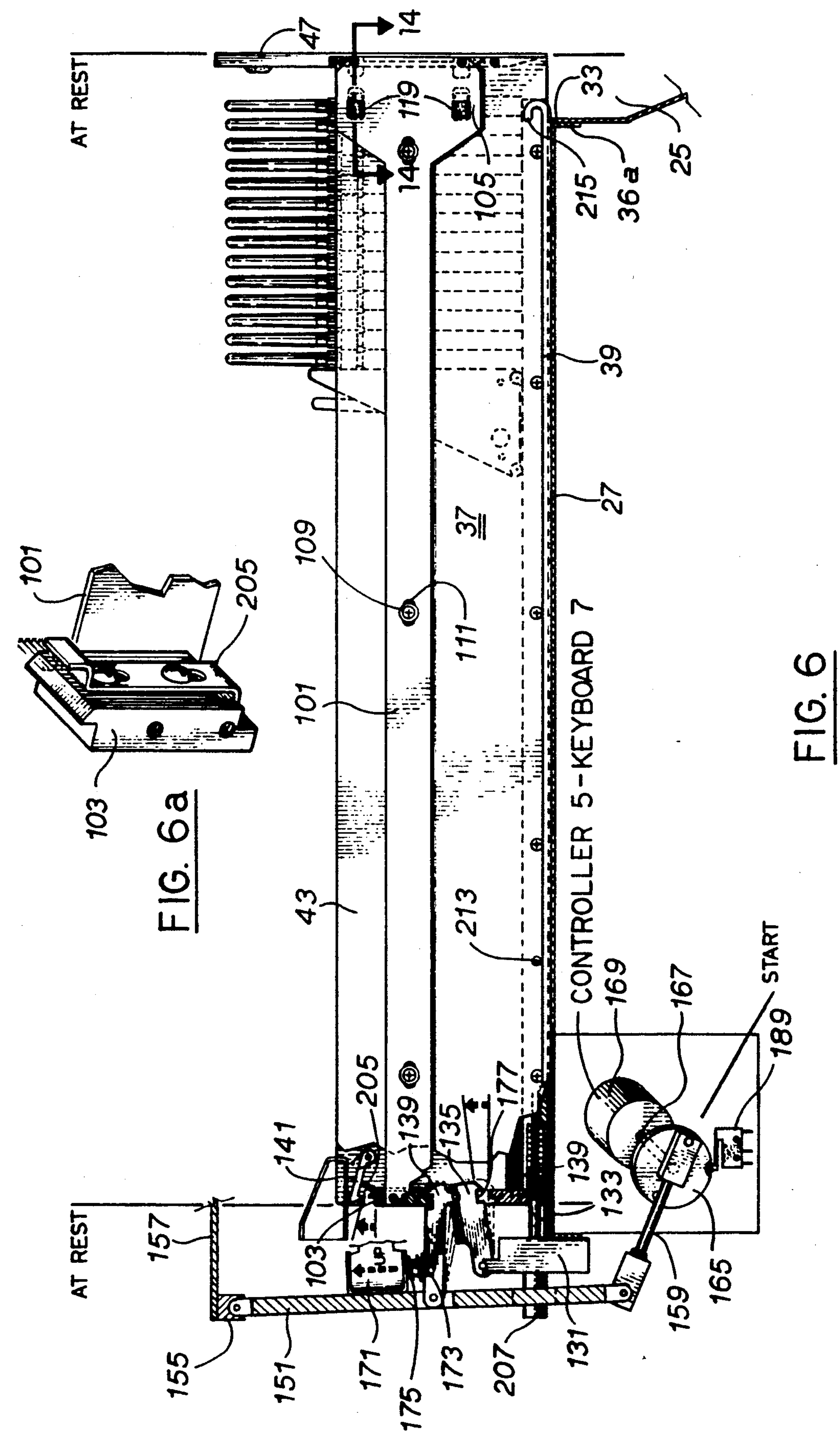
FIGS. 6 through 10 are side elevational views similar to FIG. 4 showing the interaction of the ejector means, the bi-sequential locking means and the actuator means leading to dispensing of a pharmaceutical item into the retrieval tray and return to locked position as shown in FIG. 4.
FIG. 6*a* is a fragmentary trimetric view of the common lock bracket shown in FIG. 6.

To begin the dispensing cycle, and as shown in FIG. 6, solenoid 171 is energized to lift solenoid shaft 173 against the bias pressure of shaft spring 175 and raise magazine locking arm 135 out of lock engagement with magazine lock bracket 137 while simultaneously raising magazine ejector lock arm 139 into locking engagement with common lock bracket 103. At the same time, magazine ejector lock arm 139 moves an elongated strap 205, slidably carried in vertical arrangement on lock bracket 103, upward to move keeper arm 141 out of engagement with lock bracket 103 thereby fully engaging magazine ejector lock arm 139 with actuator plate 151 and disengaging it from magazine 37.

During this movement, motor 169 is not energized and actuator plate 151 remains motionless. In addition, as shown in FIGS. 6 and 14a, stock retainers 119 remain pivoted inwardly by the forward position of aperture edges 128b relative to aperture rear edges 127a to forcibly restrain syringes 45 from forward movement in magazine 37.

Figure 7:
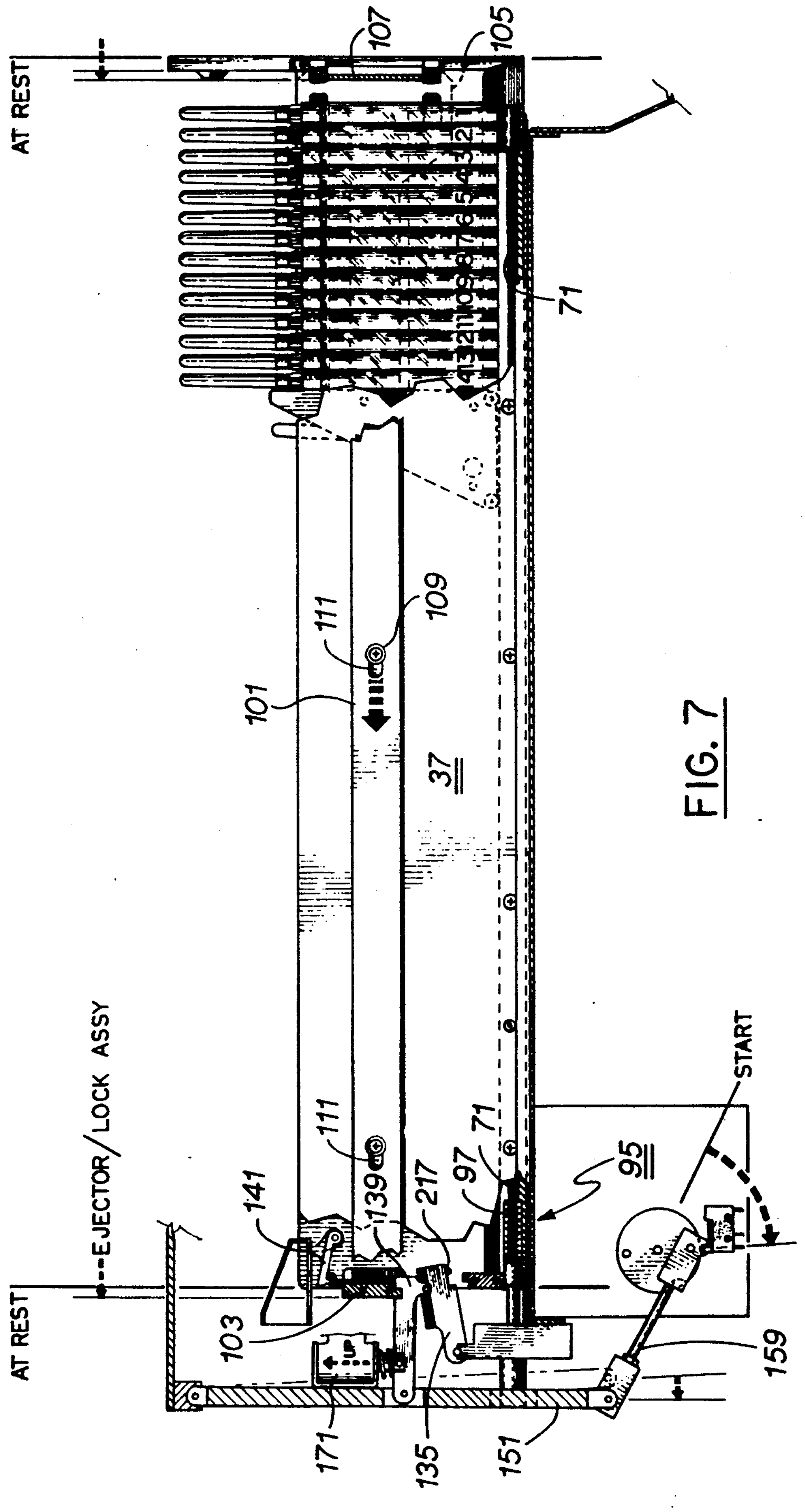
Figure 8:
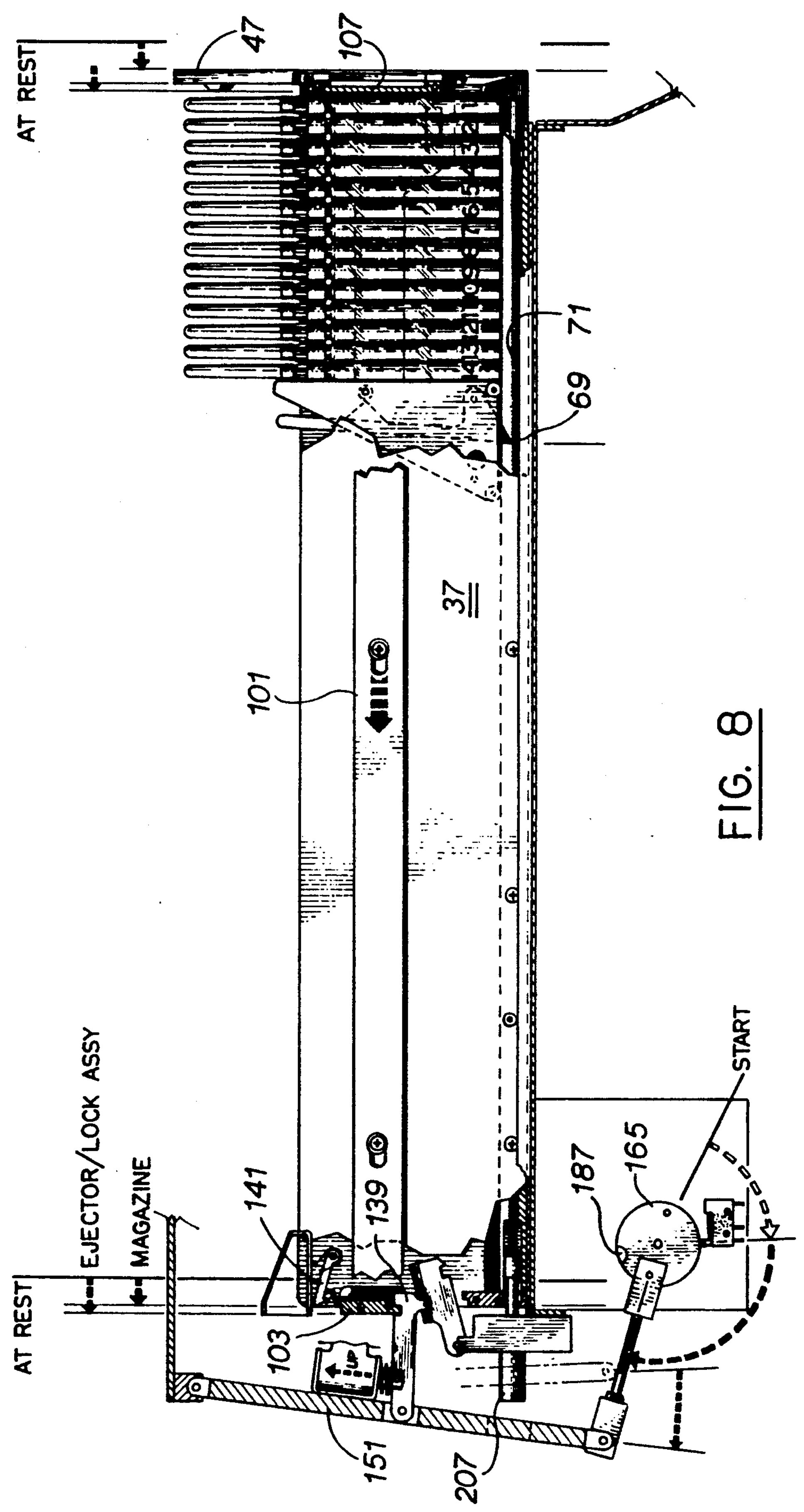

As shown in FIG. 7, motor 169 is energized to cause eccentric arm 159 to pivot actuator plate 151 rearward causing magazine ejector lock arm 139 to draw narrow members 101 rearward. After a short length of movement, i.e. approximately one-eighth of an inch, guide stops 109 abut the forward edge of elongated apertures 111. As shown in FIG. 8, motor 169 is further energized to turn drive wheel 165 and move actuator plate 151 further rearward causing magazine ejector lock arm 139 to draw both ejector means narrow members 101 as well as magazine 37 rearward in chassis 13. Simultaneous therewith, reference bar 107 is also drawn rearward with narrow members retainer support plates 105 to abut the first syringe 45 in magazine 37. Should the pivotal movement of actuator plate 151 overdraw reference bar 107 against syringe 45, an over-travel spring 207, axially located in reference block 131 behind element 133, allows rachet rod 71 to move rearward thereby relieving excessive pressure against syringe 45 that would, in the absence of over-travel spring 207, cause reference bar 107 to crush the syringe. The use of over-travel spring 207 allows the stocking of quantities of pharmaceutical items in each magazine having different diameters from those items of other magazines without the need to precisely adjust the rearward travel of actuator plate 151.

Figure 9:
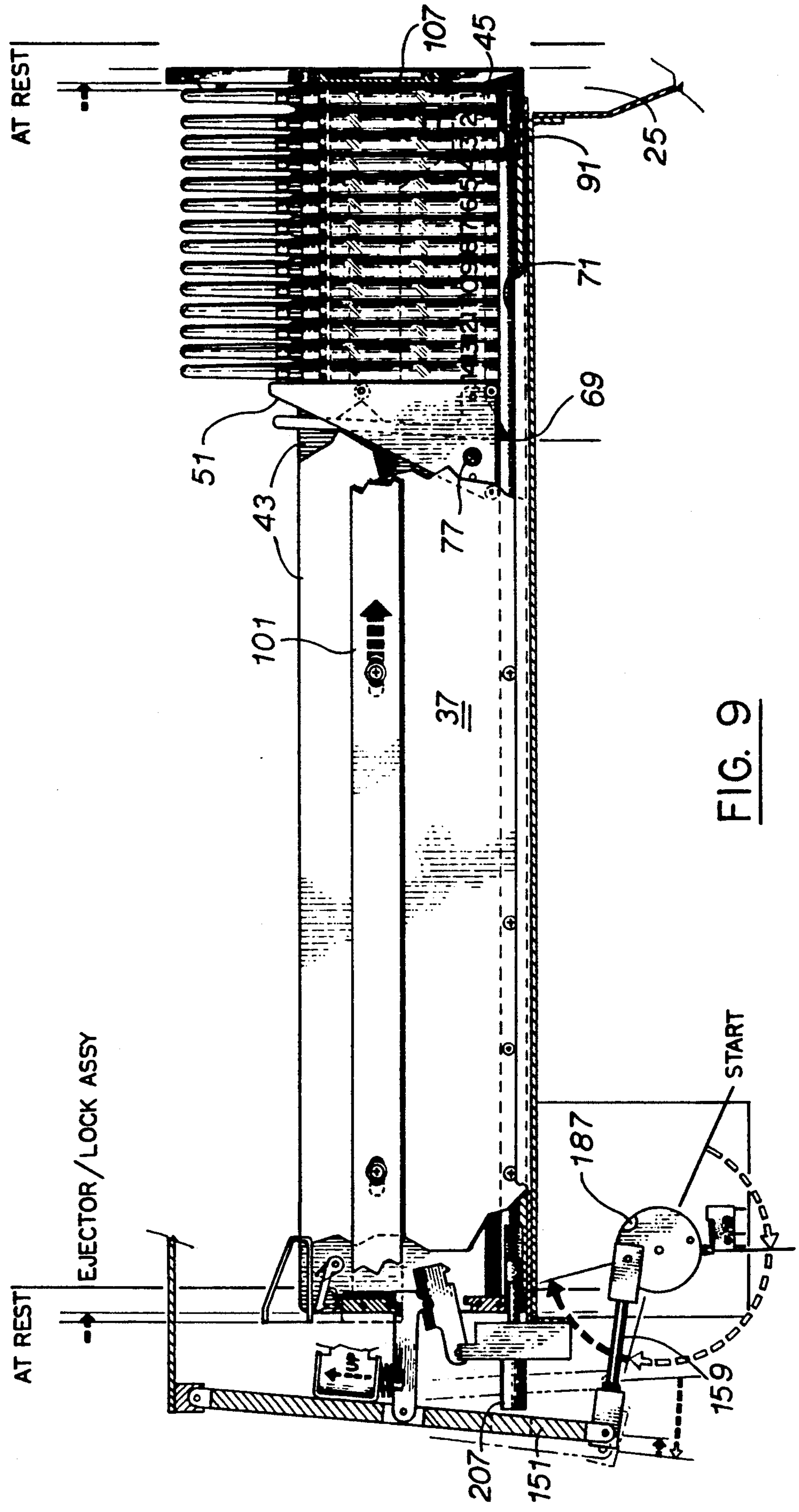

As shown in FIG. 9, motor 169 is further energized to cause eccentric arm 159 to begin pivoting actuator plate 151 in a forward motion. During this first bit of travel, ejector means narrow members 101 begin forward motion relative to magazine panels 43. After a short movement, retainer support plates 105 strike magazine front block 47 moving it forward. During all of this motion backward and forward, rachet rod 71 remains motionless other than the slight rearward motion thereof against over-travel spring 207 when the pressure of reference bar 107 becomes significant against the front syringe. During rearward movement of magazine 37, shuttle 51 remains motionless with respect to rod 71 and chassis 13 because of the interference between pawl 69 against rachet rod threads 73. When magazine 37 begins its forward motion, shuttle friction device 77 causes shuttle 51 to move with magazine side panels 43 and displace itself forward in the magazine. During this movement, pawl 69 "clicks" over rachet rod threads 73 as previously described.

During the cycling as shown in FIGS. 8 and 9, guide block 91 remains under the first syringe 45 while it is being moved forward by shuttle 51 over top of discharge chute 25. As shown in FIG. 10, motor 169 turns drive shaft 167 and drive wheel 165 through the rest of its single 360° turn so that cycle tracking and control means 185 is activated to shut off motor 169. During the balance of this turning, actuator plate 151 moves magazine 37 forward and shuttle 51 moves first syringe 45 further off from its support on guide block 91 to allow it to drop down into retrieval tray 23 as shown in FIG. 4. Usually these pharmaceutical items topple over onto their side for easy extraction from tray 23, however, should they remain upright, they can be turned sideways with the fingers for easy removal. Upon completion of the 360° motion as shown in FIG. 10, solenoid 171 is deactivated to allow solenoid shaft 173 to drop downward and force magazine locking arm back down into locked relationship with magazine lock bracket 137 and simultaneously to urge magazine ejector lock arm 139 downward to release its upward pressure against pin 205 to allow keeper arm 141 to drop down into locking engagement with lock bracket 103. The dispensing sequence has now been completed.

A typical cycle such as is described above occurs each time a pharmaceutical unit is to be dispensed from one of the magazines into retrieval tray 23. The dispensing sequence takes only one full revolution of drive wheel 165 and occupies less than about three seconds of time. During the dispensing cycle, front block 47 and intervening discharge chute 25 remain virtually motionless and access door 19 remains in locked configuration in cabinet 1 to prevent any access whatsoever to the interior of chassis 13.

Figure 15:
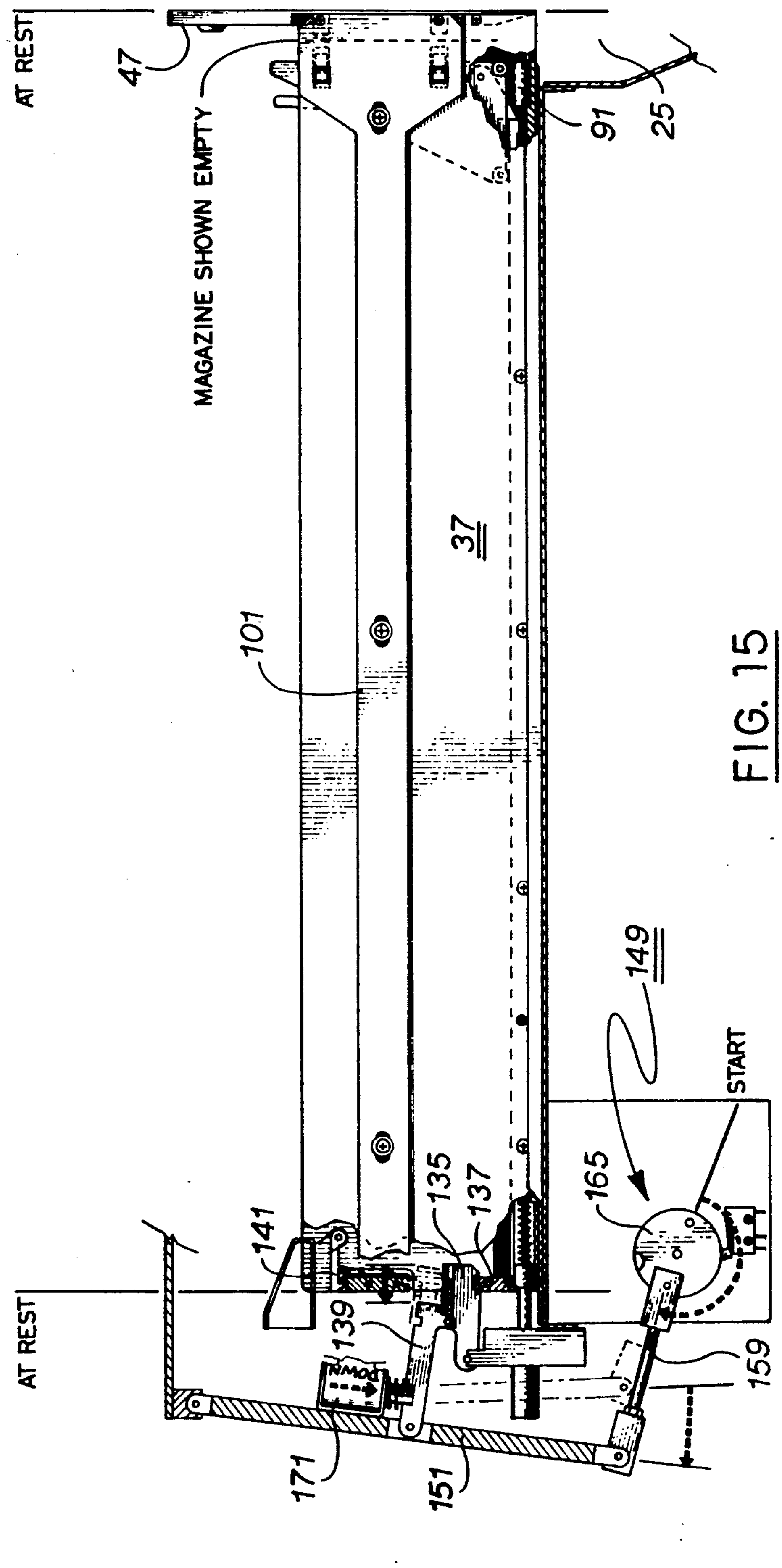
FIGS. 15 through 19 are side elevational, partly sectional views similar to FIGS. 5 through 10 showing the operation of the bi-sequential locking means during the reloading cycle.

Upon receipt of other properly encoded data through keyboard 7 and control unit 5, actuator means 149 may be directed to unlock a specific magazine to allow it to be opened and withdrawn, partially or fully, for reloading with new stock. The loading sequence is shown in FIGS. 15 through 20. The unlocking sequence begins at FIG. 15 and shows a particular magazine 37 to be emptied of its stock of pharmaceutical items. Beginning with the configuration shown in FIG. 5*a* in locked and defaulted or de-energized condition, FIG. 15 shows the first step that upon receipt of properly encoded data, actuator means 149 operates to begin turning drive wheel 165 by motor 169 without energizing solenoid 171.

Figure 16:
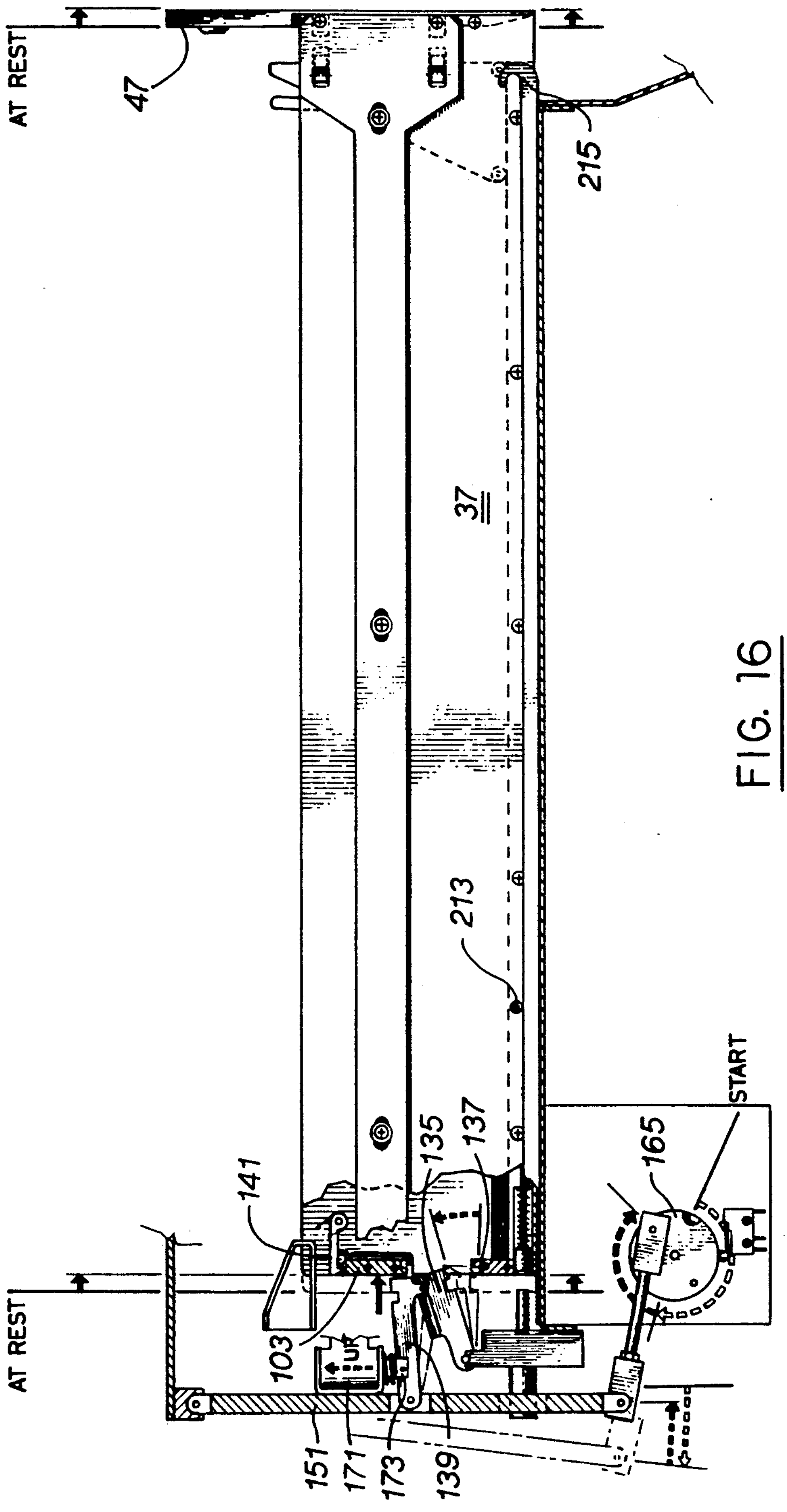

The turning of drive wheel 165 causes eccentric arm 159 to move actuator plate 151 rearward. Magazine locking arm 135 remains in locked interconnection with lock bracket 137 during the first approximately 180° of turn of drive wheel 165. Simultaneously, solenoids 179 are energized to move keeper arms 181 out of locked engagement with door latches 183 to allow front access door 19 to be pivoted outward and downward to expose the front blocks 47 of all the magazines. As shown in FIG. 16, when ejector lock arm 139 reaches its rearward travel, solenoid 171 is energized raising solenoid shaft 173 and magazine locking arm 135 out of locking engagement with magazine lock bracket 137. Keeper arm 141 remains engaged so that narrow members 101 remain interlocked with magazine 37.

Upon energizing solenoid shaft 173, drive wheel 165 is caused to turn as shown in FIG. 16 bringing actuator plate 151 forward and impacting magazine ejector lock arm 139 against the back surface of magazine lock bracket 103. When this occurs, the specific magazine 37 is pushed forward a short distance, i.e. three-eights of an inch, so that it may be grasped by the fingers and pulled forward through open access door 19. When the specific magazine is moved forward for removal, the other magazines remain in tight, fully secured locked position as shown in FIG. 3 so that access is denied to any of the stock contained in these locked magazines.

Figure 20:
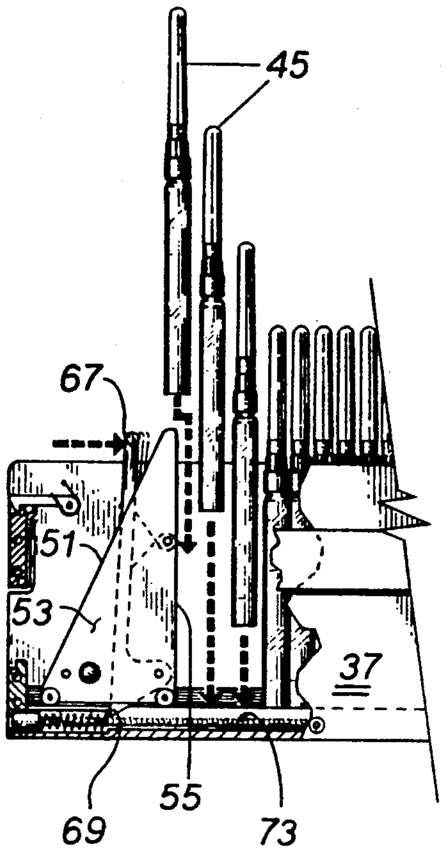
FIG. 20 is a fragmentary side view of the magazine showing how the shuttle may be repositioned to allow loading of new pharmaceutical items in the magazine.

In one embodiment of this invention, magazine 37 may be totally removed from chassis 13 for transportation to a pharmacy or other area for reloading. In another embodiment of this invention shown in FIG. 21, a cross pin 213 is transversely mounted on the outside bottom edge of magazine guide 39 for engagement with a hook-shaped member 215 extending forward from magazine guide 39 into the open interior of discharge chute 25. As shown in FIG. 21, once access door 19 is open and dropped down to approximately a 45° angle, magazine 37 may be pulled out of chassis 13 until cross pin 213 engages hook-shaped member 215 and thereafter the magazine may be tilted down for loading without total removal from chassis 13 as shown in FIG. 3. As shown in FIG. 20, to load the magazine, moveable handle 67 on shuttle 51 is squeezed toward the vertical front edge 55 of shuttle plates 53 to raise pawl 69 out of engagement with rachet rod thread 73 and thereafter shuttle 51 moves by its guide rollers rearward in the magazine to allow new pharmaceutical items to be deposited between stock retainers 119 and shuttle 51 vertical front edge 55.

Figure 17:
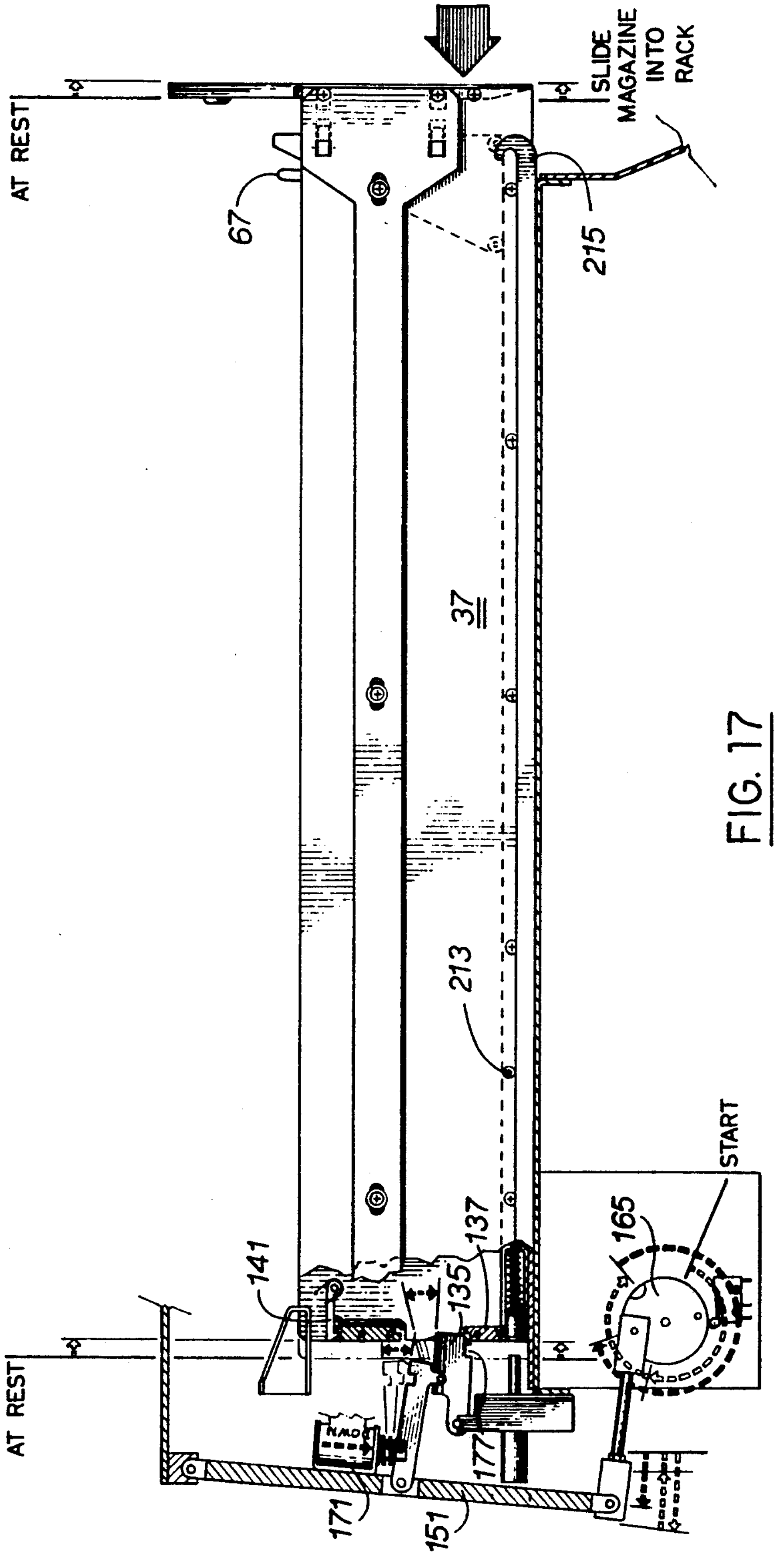
Figure 19:
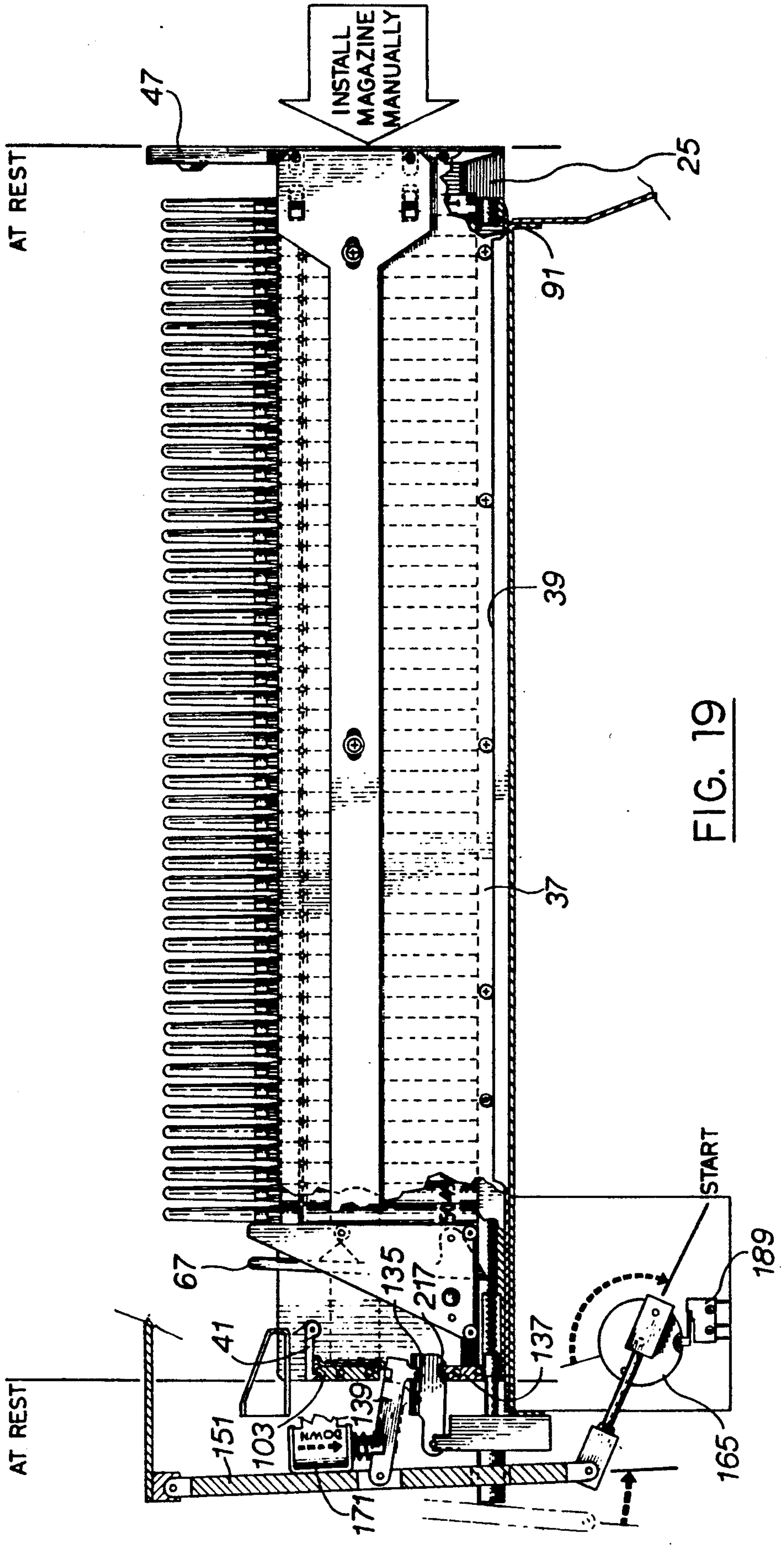

Upon reloading, magazine 37 is placed back in its particular magazine guide 39 and re-inserted into cabinet 1. As shown in FIG. 17, magazine lock bracket 137 strikes a beveled surface 217 (see FIG. 7) formed on the lower front edge of magazine locking arm 135 allowing arm 135 to be raised up to snap over into locking engagement with notch 177 upon complete insertion of the magazine. Thereafter, as shown in FIG. 19, drive wheel 165 is caused to turn through the balance of its 720° or two full turns to bring the fully loaded magazine back into its fully locked configuration as shown in FIG. 5*a*.

Figure 24A:
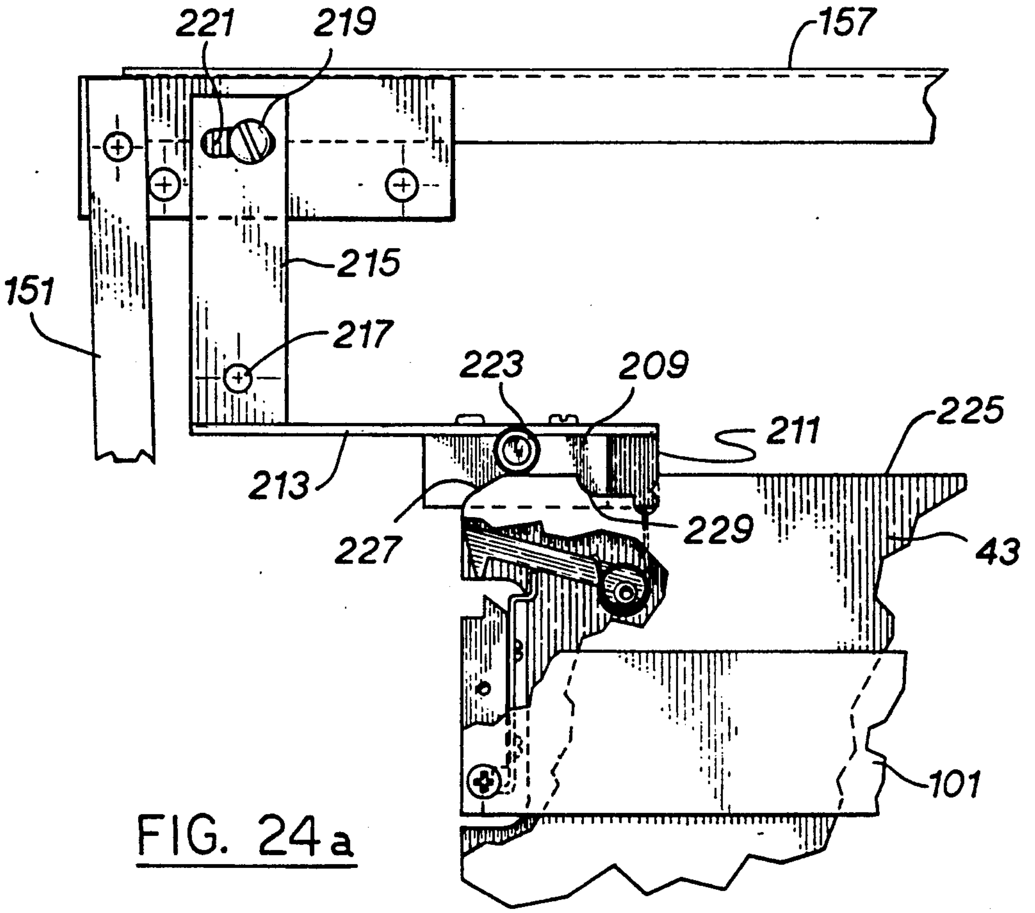
FIG. 24*a* is a fragmentary side view of another embodiment of this invention showing a guide block mounted at the rear of the sub-assembly for retaining a magazine in aligned position and FIG. 24*b* is a top view of a portion of the embodiment; and, FIG. 25*a* is a fragmentary side view of another embodiment of the door opening mechanism that allows the door to swing automatically outward to a partially opened position where slight inward pressure on the door releases it to be lowered into the full opened position
Figure 24B:
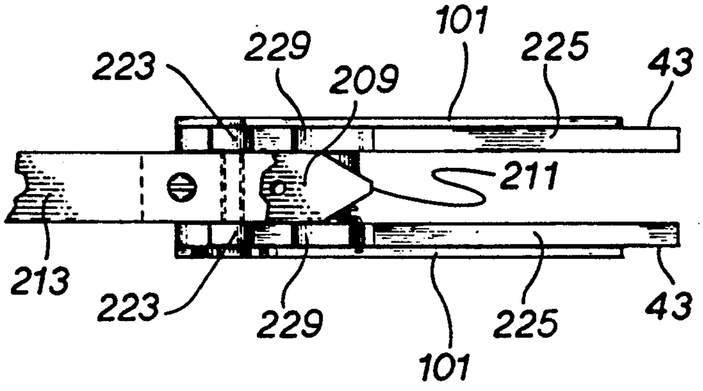

An alternate embodiment is shown in FIGS. 24*a* and 24*b* where spring fingers 48*a*–48*b* are replaced by a guide assembly comprising a guide block 209 including a pointed guide block nose 211 held in position to slide between the upper rear portions of magazine side panels 43 by a leaf spring 213. Spring 213 is attached at its distal end to a riser bar 215 that is pivotally attached to chassis 13 at a pin 217 and retained at a desired angle by an adjustment screw 219 passing through an arc-shaped opening 221 formed in said riser bar a spaced distance from pivot pin 217. A roller 223 is mounted on guide block 209 and arranged for contact with the top edge 225 of side panel 43 spaced a very short distance ahead of a ramp 227 formed at the rear upper corner of magazine side wall 43. A detent opening 229 is formed a spaced distance ahead of said rear upper corner of magazine side wall 43 for temporary receipt of roller 223.

In operation, when magazine 37 is pushed into position in subassembly 11, guide block nose 211 passes between magazine side walls 43 thereby moving guide block 209 into position to hold the walls vertical and in position. Simultaneously, guide block roller 223 contacts ramp 227 and raises guideblock 209 into position above and in between panels 43, against the bias pressure of leaf spring 213. In this configuration, magazine 37 can move back and forth in its dispensing mode while being more rigidly retained against side movement than with spring fingers 48*a*–48*b* of the previously described embodiment.

During a dispensing cycle, the rearward movement of magazine side panels 43 move detent opening 229 under guide block roller 223 where spring 213 biases it downward into said detent to cause magazine 37 to be retained while shuttle 51 moves the inventory of vials forward. Upon forward movement of magazine side panels 43, at the end of the dispensing cycle or when magazine 37 is to be removed for reloading, leaf spring 213 allows guide block roller 223 to move upward and out of detent 229.

Figure 25B:
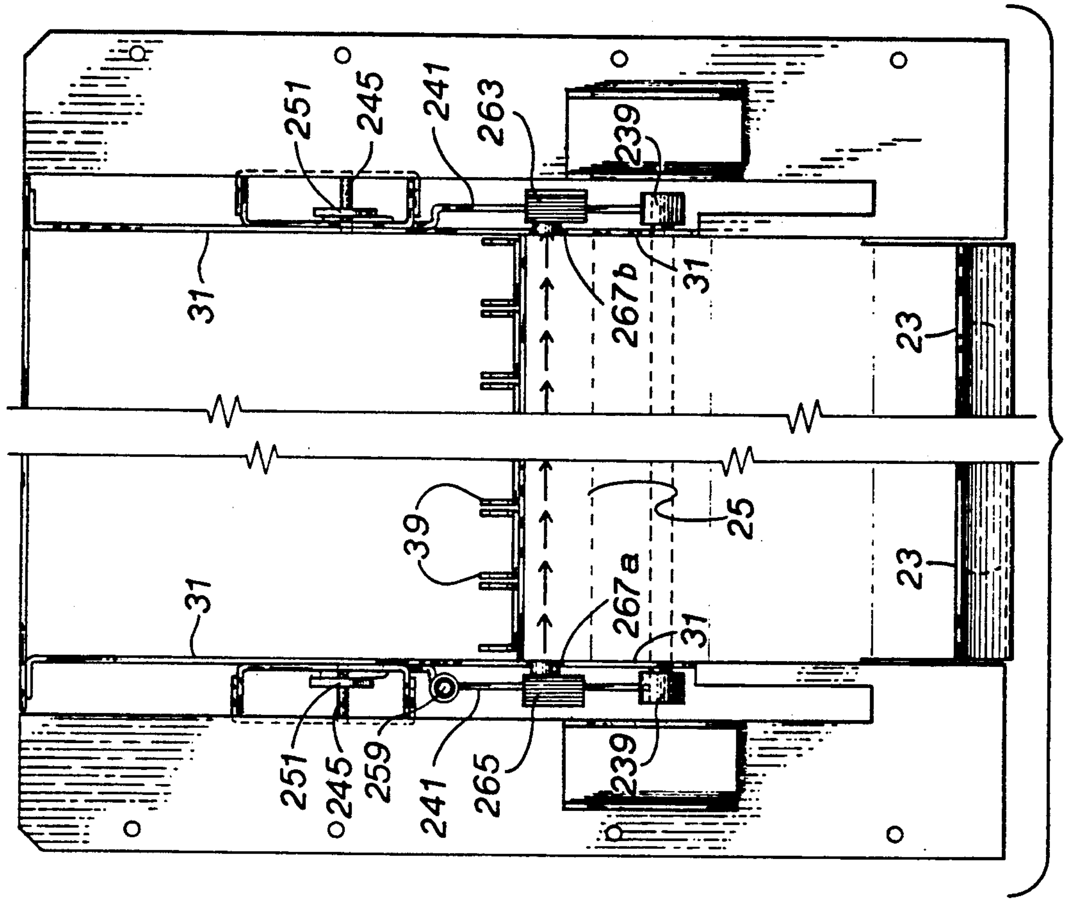
FIG. 25*b* is a fragmentary front elevation view showing a unique item counter mechanism associated therewith.
Figure 25A:
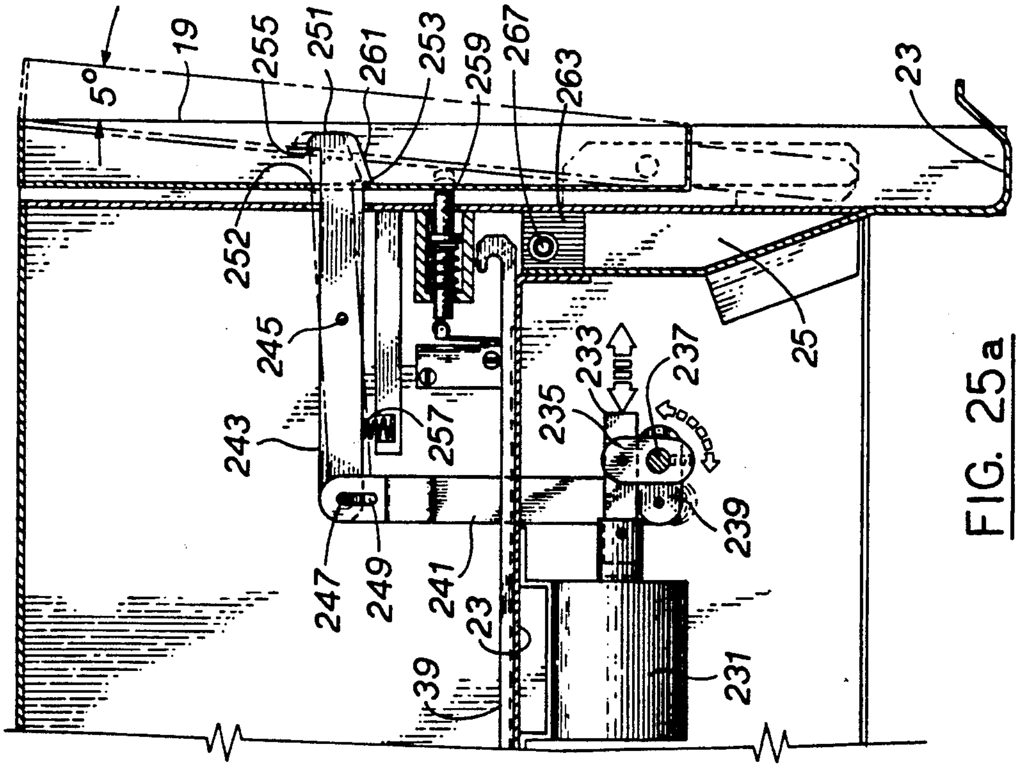

Another embodiment of a door opening mechanism is shown in FIG. 25*a*. A door unlatching solenoid 231 supports a horizontal solenoid shaft 233 positioned below tray 23 and is attached to a first link 235 that is in turn attached to a pivot shaft 237. A second link 239 is attached at one end to pivot shaft 237 and is attached at its other end to a vertically positioned third link 241. A horizontal cross-arm 243 is pivotally mounted by a center pin 245 in or outboard of drawer side wall 31 and has one end slidingly connected to the upper end of third link 241 by an end pin 247 that rides in vertically oriented slot 249 formed in the upper end of third link 241. The other or forward most end 251 of cross-arm 243 extends through an aperture 252 into access door 19. A downward facing hook 253 and an upward facing hook 255 are formed at cross-arm end 251.

When access door 19 is in its upward, closed position, it is retained in this position by the position of downwardly facing hook 253 in latched engagement with a portion of the metal wall making up door 19. Cross-arm 243 is biased upward by a coil spring 257 that presses against the underside thereof aft of center pin 245 so as to keep hook 253 biased downward and engaged to door 19.

When door 19 is to be opened, solenoid 231 is caused to pull solenoid shaft in a first rearward movement and then forward in a second movement to restore it to its initial position. During the first movement, pivot shaft 237 is rotated in a counter-clockwise direction as viewed in FIG. 25*a*. Second link 239 is also caused to turn counter-clockwise and pulls third link 241 downward. When slot 249 is pulled fully downward it causes end pin 247 to pull downward on the end of cross-arm 243 and pivot downwardly facing hook 253 upward, out of contact with door 19. A spring-loaded microswitch 259, used to indicate when door 19 is closed, presses against the inside of door 19 thus forcing it outward when hook 253 is disengaged.

When door 19 is released, the spring bias of microswitch 259 forces it outward. However, as downwardly facing hook 253 is raised out of contact with door 19, upwardly facing hook 255, spaced outwardly therefrom (approximately $\frac{3}{4}$ inch) moves into contact with upper edge of aperture 252 and "catches" the door after only a short outwardly pivotal movement, e.g. 5°. Solenoid shaft 233 is now moved forward into its original position thus moving first, second and third links 235, 239 and 241 respectively back to their original positions. The upward bias of coil spring 257 thus urges upwardly facing hook downward but this downward movement is restricted by the biased outward position of partially opened access door 19 against hook 255. By slightly pressing door 19 inward, upwardly facing hook is released for downward movement and door 19 may be swung fully downward. Upon closing, door 19 is lifted upwardly and inwardly allowing the inner wall to bear against the beveled front edge 261 of downwardly facing hook 253 urging it upward against he bias pressure of spring 257 to drop over into locked engagement therewith.

In this embodiment a counter 263 is provided to count each item dispensed in a cycle. As shown in FIG. 25*b*, counter 263 comprises an infrared generator 265 whose rays are directed across discharge chute 25 through apertures 267*a* and 267*b* formed in side walls 31. The steady beam is interrupted during a dispensing cycle by the opaque body of the dispensed item dropping down the chute and this event is recorded by counter 263 as a cross-check against the dispensing cycle.

While the invention has been described with reference to a particular embodiment hereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of the invention.

What is claimed is:

1. A sub-assembly for use in a medication dispenser station for controller actuated dispensing of pharmaceutical items in single quantities from locked storage and allowing rapid reloading of more items all under extreme security and heightened accountability, comprising:

a) a chassis for insertion into the cabinet for secure mounting therein, including an unlockable front reloading access door, pharmaceutical retrieval tray depending therebelow and a discharge chute opening from interior said access door down into said tray;

b) at least one narrow stock-supporting magazine slidably mounted in said chassis extending rearward from inside said front access door for retaining a stock of pharmaceutical items in vertically oriented, front-to-rear alignment therein;

c) ejector means interconnected to said magazine for moving the forward-most pharmaceutical item in said magazine into position over said discharge chute for dispensing into said retrieval tray upon command while retaining the other items in locked storage in said magazine;

d) bi-sequential locking means for movement through one sequence to selectively unlock said ejector means from said magazine for limited inter-movement therewith to dispense a pharmaceutical item from the cabinet while maintaining all other items in locked storage, and through another sequence to release a single magazine for at least partial withdraw from said chassis for reloading and later reinsertion; and, e) motor driven actuator means in communication with a controller for receiving data and sequence commands therefrom and cycling said bi-sequential locking means through its appropriate sequence.

2. The medicine cabinet sub-assembly of claim 1 including a plurality of said magazines in side-by-side arrangement substantially across the full width of said chassis for holding a large number of pharmaceutical items.

3. The medicine cabinet sub-assembly of claim 1 wherein said chassis occupies space in the cabinet which is equal to a space taken up by one drawer of the cabinet.

4. The medicine cabinet sub-assembly of claim 1 wherein said chassis occupies space in the cabinet which is equal to a space taken up by two drawers of the cabinet.

5. The medicine cabinet sub-assembly of claim 1 wherein said chassis includes a base plate defined by a rectangular periphery bounded by a pair of spaced-apart upwardly extending side walls, and a front marginal edge forming the rear edge of said discharge chute.

6. The medicine cabinet sub-assembly of claim 5 further including an upwardly opening U-shaped magazine guide extending along said chassis base plate for receipt of said magazine in sliding relationship therein and wherein said magazine comprises:

a) a U-shaped magazine base slidingly received in said magazine guide;
b) a pair of spaced-apart stock supporting side panels extending upward from said magazine base; and,
c) a front block vertically arranged at the front of said spaced-apart side panels to retain said panels in spaced-apart alignment.

7. The medicine cabinet sub-assembly of claim 6 including shuttle means received between said magazine panels for maintaining positive pressure against the pharmaceutical items held in stock in said magazine and to urge them forward in said magazine toward said discharge chute wherein said shuttle means comprises:

a) a pair of spaced-apart shuttle plates slidingly received between said magazine side panels having common vertical front edges and common bases including spaced-apart front and rear pairs of guide rollers received in complementary guide grooves formed in said magazine side panels;
b) a shuttle rachet pivotally mounted between said shuttle plates defined by an upwardly extending movable rachet handle and lower extending pawl;
c) an elongated rachet rod carried in said magazine base for reciprocal movement therein and having formed thereover a series of closely-spaced threads for engagement with said pawl to allow forward movement of said shuttle in said magazine and prevent rearward movement thereof.

8. The medicine cabinet sub-assembly of claim 7 further including an over travel spring axially aligned with said rachet rod for relieving stress on the pharmaceutical items stored in said magazine.

9. The medicine cabinet sub-assembly of claim 7 wherein said bi-sequential locking means comprises:

a) a reference block vertically mounted to said chassis including an element extending therefrom into axial contact with said rachet rod;
b) a magazine locking arm pivotally attached to said reference block and adapted to swing into locking relationship with said magazine; and,
c) a magazine ejector lock arm slidingly carried in said magazine locking arm for interlocking with said ejector means.

10. The medicine cabinet sub-assembly of claim 9 further including a keeper arm pivotally mounted on said magazine for interlocking with said ejector means to prevent unwanted intermovement therebetween.

11. The medicine cabinet sub-assembly of claim 7 wherein said shuttle means further includes a shuttle friction device comprising:

a pair of concave cups arranged in mutually faced-apart axial alignment carried in aligned apertures formed in said shuttle plates, each said cup containing a flat base over which an outer frictional surface is formed;
b) each of said cups including an upstanding circumferential side wall; and,
c) a spring inserted axially between said sidewalls of said cups and partially received therein to bias said cups outward into frictional contact with said shuttle plates.

12. The medicine cabinet sub-assembly of claim 6 further including a cross pin transversely mounted on said magazine base for engagement with a hook-shaped member extending from said magazine guide to permit said magazine to be tilted downward, following withdraw from said chassis, at an angle to expose said magazine for rapid reloading.

13. The medicine cabinet sub-assembly of claim 1 further including shuttle means in communication with said magazine for maintaining positive pressure against the pharmaceutical items held in said magazine and to urge them forward in said magazine toward said discharge chute.

14. The medicine cabinet sub-assembly of claim 1 wherein said front reloading access door is arranged to pivot downward below the horizontal to expose said magazine for removal from said chassis.

15. The medicine cabinet sub-assembly of claim 1 wherein said ejector means comprises:

a) a pair of spaced-apart narrow members extending forward in said chassis along the outside of said magazine and expanding to form a pair of spaced-apart retainer support plates;
b) a narrow upstanding reference bar attached between said retainer support plates at the front of said magazine; and,
c) a plurality of guide stops interconnecting said narrow members and said magazine to permit limited sliding relationship there between for providing controlled movement of said magazine during the dispensing cycle.

16. The medicine cabinet sub-assembly of claim 15 further including: at least two stock retainers pivotally mounted in aligned apertures formed respectively in said magazine and said narrow arms, said retainers including an extended tooth for movement into said magazine for contact with the pharmaceutical items stored therein and further including a movement control edge formed apart from said tooth for bearing against said aperture formed in said retainer support plates to pivot said tooth into said magazine and outward, apart from said pharmaceutical items, to allow passage of one said item during the dispensing cycle.

17. The medicine cabinet sub-assembly of claim 1 further including at least one solenoid arranged to unlatch said front access door prior to removing a magazine from said chassis.

18. The medicine cabinet sub-assembly of claim 1 wherein said bi-sequential locking means interlocks said magazine and said ejector means to prevent unwanted intrusion into said chassis until acceptable data commands have been inputted to the controller.

19. The medicine cabinet sub-assembly of claim 1 wherein said actuator means comprises:

a) an actuator plate spanning substantially the total width of said chassis and pivotally mounted at the top thereof;
b) a motor driven drive wheel spaced apart from said actuator plate; and,
c) an eccentric arm of terminal length pivotally attached at one terminal end to said actuator plate and pivotally attached at the other terminal end to said drive wheel spaced apart from the center thereof for swinging said actuator plate to and fro as a function of turning of said drive wheel for interaction with said actuator means to cycle said magazines through a dispensing cycle or, upon command, a reloading cycle.

20. The medicine cabinet sub-assembly of claim 19 further including a solenoid to shift said actuator means into respective positions to begin, upon command, a dispensing cycle or a reloading cycle.

21. The medicine cabinet sub-assembly of claim 19 further including cycle tracking and control means to monitor the turning of said drive wheel and control the power provided to said motor appropriate with the amount of turning of said drive wheel needed for said dispensing cycle and said reloading cycle.

22. The medicine cabinet sub-assembly of claim 21 wherein said cycle tracking and control means includes a detent formed in said drive wheel, a detent switch mounted in close proximity thereto and a detent switch arm extending from said detent switch into contact with said drive wheel and adapted to enter said detent to control the power directed to said drive motor.

23. The medicine cabinet sub-assembly of claim 21 wherein said cycle tracking and control means includes an aperture formed in a thin outer collar concentrically mounted about said drive wheel, and an optical sensor positioned over said collar having an infrared source directed against said collar and a infrared receptor positioned on the opposite side of said collar and arranged to receive radiation from said infrared source through said aperture when said aperture is aligned therebetween to monitor the angular displacement of said drive wheel.

24. The medicine cabinet sub-assembly of claim 1 further including a magazine guide assembly comprising:

a) a guide block for sliding engagement with said magazine;
b) a leaf spring attached to said guide block for applying stabilization bias pressure against said magazine;
c) a riser bar attached to said leaf spring and mounted to said chassis through spaced-apart pivot pin and adjustment screw passing through a slot aperture in said bar for adjusting the position of said guide block;
d) a roller mounted on said guide block for riding along the top edge of said magazine during movement of said magazine during dispensing and loading cycles; and,
e) a detent formed in the top edge of said magazine for temporary receipt of said roller during a portion of the dispensing cycle.

25. The medicine cabinet sub-assembly of claim 1 including a door opening mechanism comprising:

a) a door unlatching solenoid support a horizontal solenoid shaft that is arranged to move back and forth below said magazine and interior of said door;
b) a pivot shaft;
c) a plurality of links interconnecting said solenoid shaft and said pivot shaft to a cross-arm, said cross-arm pivotally mounted and having an upwardly facing hook and a downwardly facing hook formed at one end thereof arranged to pass through an aperture into said door; and,
d) bias means for urging said cross-arm into closed latching connection with said door whereby, upon cycling said solenoid shaft from its rest position to a second position and back to rest position, said pivot shaft causes said downwardly facing hook to release said door for movement outward through a small arc until said upwardly facing hook engages said door in a partially opened position, for later release to a full open position by pressing slightly against said door to allow said upwardly facing hook to disengage said door under pressure from said bias means.

26. The medicine cabinet sub-assembly of claim 25 further including a ramp formed on said distal end of said cross-arm for engagement with said door upon closing to urge said cross-arm upward against the pressure of said bias means and allow engagement of said downwardly facing hook with said door upon full closure of said door.

27. The medicine cabinet sub-assembly of claim 1 further including an item counter, comprising:

a) an infrared generator arranged to direct an infrared beam in a single direction;
b) a pair of apertures formed in said chassis, one on each side of said discharge chute for passing said beam therethrough; and,
c) a counter for denoting interruptions of said beam upon passage of an opaque item down said discharge chute.

* * * * *